(12) United States Patent
Kumar et al.

(10) Patent No.: US 11,792,467 B1
(45) Date of Patent: Oct. 17, 2023

(54) SELECTING MEDIA TO COMPLEMENT GROUP COMMUNICATION EXPERIENCES

(71) Applicant: Amazon Technologies, Inc., Seattle, WA (US)

(72) Inventors: Sanjeev Kumar, Redmond, WA (US); Ankit Kumar Yadav, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/355,076

(22) Filed: Jun. 22, 2021

(51) Int. Cl.
| H04N 21/43 | (2011.01) |
| H04N 21/433 | (2011.01) |
| H04N 21/25 | (2011.01) |
| H04N 21/6405 | (2011.01) |
| H04N 21/422 | (2011.01) |

(52) U.S. Cl.
CPC ..... *H04N 21/43076* (2020.08); *H04N 21/252* (2013.01); *H04N 21/4221* (2013.01); *H04N 21/4333* (2013.01); *H04N 21/6405* (2013.01)

(58) Field of Classification Search
CPC ........... H04N 21/43076; H04N 21/252; H04N 21/4221; H04N 21/4333; H04N 21/6405
See application file for complete search history.

(56) References Cited

U.S. PATENT DOCUMENTS

| 8,023,800 | B2 | 9/2011 | Concotelli |
| 8,560,683 | B2 | 10/2013 | Funk et al. |
| 8,572,243 | B2 | 10/2013 | Funk et al. |
| 8,768,782 | B1 | 7/2014 | Myslinski |
| 8,850,301 | B1 * | 9/2014 | Rose ............... G06F 16/94 715/208 |
| 9,003,032 | B2 | 4/2015 | Funk et al. |

(Continued)

FOREIGN PATENT DOCUMENTS

| AU | 2013204532 B2 | 11/2014 |
| CA | 2977959 A1 | 9/2016 |

(Continued)

OTHER PUBLICATIONS

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.XML.

(Continued)

*Primary Examiner* — Joshua D Taylor
(74) *Attorney, Agent, or Firm* — Athorus, PLLC

(57) ABSTRACT

Messages provided by users in a group communication experience are processed to identify media based on content of the messages. The messages may include references to artists, titles, genres, or eras of media, or express sentiments regarding the group communication experience. Media identified based on such references or sentiments is retrieved and transmitted to devices of one or more users participating in the group communication experience. The media is identified for users or for the group communication experience based on subjective or objective factors and played by the devices of the users participating in the group communication experience.

20 Claims, 28 Drawing Sheets

(56) References Cited

U.S. PATENT DOCUMENTS

| | | |
|---|---|---|
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,422 B1 | 1/2019 | Panchaksharaiah et al. |
| 10,178,442 B1 | 1/2019 | Shkedi |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,719,837 B2 | 7/2020 | Kolowich et al. |
| 10,769,678 B2 | 9/2020 | Li |
| 10,846,330 B2 | 11/2020 | Shilo |
| 10,985,853 B2 | 4/2021 | Bretherton |
| 10,986,064 B2 | 4/2021 | Siegel et al. |
| 10,997,240 B1 | 5/2021 | Aschner et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,580,982 B1 | 2/2023 | Karnawat et al. |
| 11,586,344 B1 | 2/2023 | Balagurunathan et al. |
| 2002/0042920 A1 | 4/2002 | Thomas et al. |
| 2002/0056087 A1 | 5/2002 | Berezowski et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1* | 2/2009 | Lutterbach .......... H04H 20/106 725/35 |
| 2009/0076917 A1* | 3/2009 | Jablokov ................ G06Q 30/02 705/14.39 |
| 2009/0100098 A1 | 4/2009 | Feher et al. |
| 2009/0254934 A1 | 10/2009 | Grammens |
| 2010/0088187 A1 | 4/2010 | Courtney et al. |
| 2010/0280641 A1 | 11/2010 | Harkness et al. |
| 2011/0063406 A1 | 3/2011 | Albert et al. |
| 2011/0067044 A1 | 3/2011 | Albo |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1* | 1/2014 | Guminy ................. G06Q 30/02 705/14.39 |
| 2014/0040494 A1 | 2/2014 | Deinhard et al. |
| 2014/0068432 A1 | 3/2014 | Kucharz et al. |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0289021 A1 | 10/2015 | Miles |
| 2015/0319472 A1* | 11/2015 | Kotecha ............. H04N 21/6131 725/62 |
| 2015/0326922 A1 | 11/2015 | Givon et al. |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0266781 A1* | 9/2016 | Dandu ............. H04N 21/42204 |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0213248 A1* | 7/2017 | Jing ......................... G06T 7/30 |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0205797 A1 | 7/2018 | Faulkner |
| 2018/0227632 A1 | 8/2018 | Rubin et al. |
| 2018/0255114 A1 | 9/2018 | Dharmaji |
| 2018/0293221 A1 | 10/2018 | Finkelstein et al. |
| 2018/0322411 A1* | 11/2018 | Wang ..................... G06F 16/35 |
| 2018/0367229 A1 | 12/2018 | Gibson et al. |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Luke et al. |
| 2019/0273570 A1 | 9/2019 | Bretherton |
| 2019/0327103 A1 | 10/2019 | Niekrasz |
| 2019/0385600 A1 | 12/2019 | Kim |
| 2020/0021888 A1 | 1/2020 | Brandao et al. |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2021/0104245 A1 | 4/2021 | Alas et al. |
| 2021/0105149 A1 | 4/2021 | Roedel et al. |
| 2021/0125054 A1 | 4/2021 | Banik et al. |
| 2021/0160588 A1 | 5/2021 | Joseph et al. |
| 2021/0210102 A1 | 7/2021 | Huh et al. |
| 2021/0217413 A1 | 7/2021 | Tushinskiy et al. |
| 2021/0232577 A1 | 7/2021 | Ogawa et al. |
| 2021/0256086 A1 | 8/2021 | Askarian et al. |
| 2021/0281925 A1 | 9/2021 | Shaikh et al. |
| 2021/0366462 A1 | 11/2021 | Yang et al. |
| 2022/0038783 A1 | 2/2022 | Wee |
| 2022/0038790 A1 | 2/2022 | Duan et al. |
| 2022/0159377 A1 | 5/2022 | Wilberding et al. |
| 2022/0223286 A1 | 7/2022 | Lach et al. |
| 2022/0230632 A1 | 7/2022 | Maitra et al. |
| 2022/0254348 A1 | 8/2022 | Tay et al. |
| 2022/0369034 A1 | 11/2022 | Kumar et al. |
| 2023/0217195 A1 | 7/2023 | Poltorak |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

GitHub, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

* cited by examiner

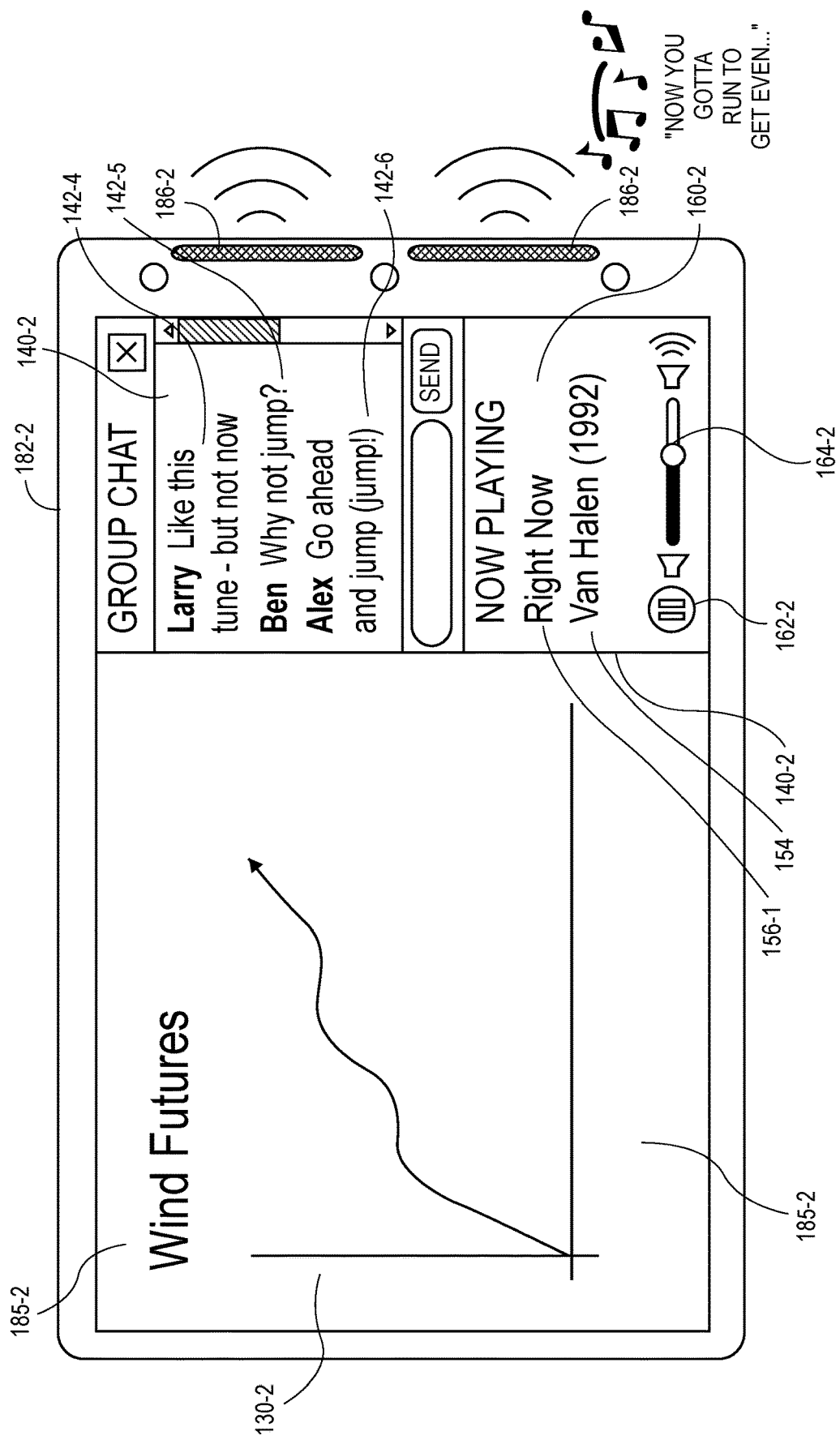

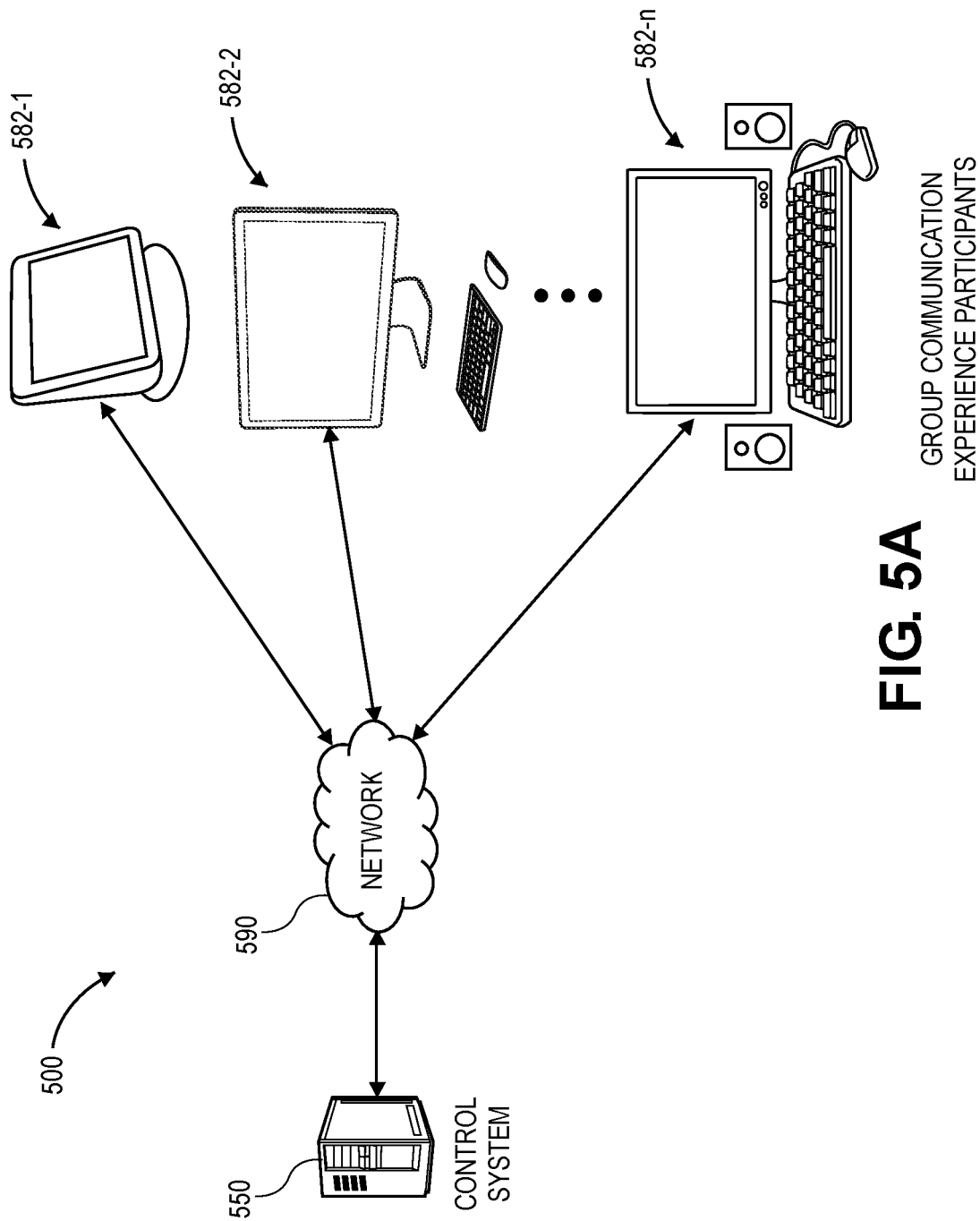

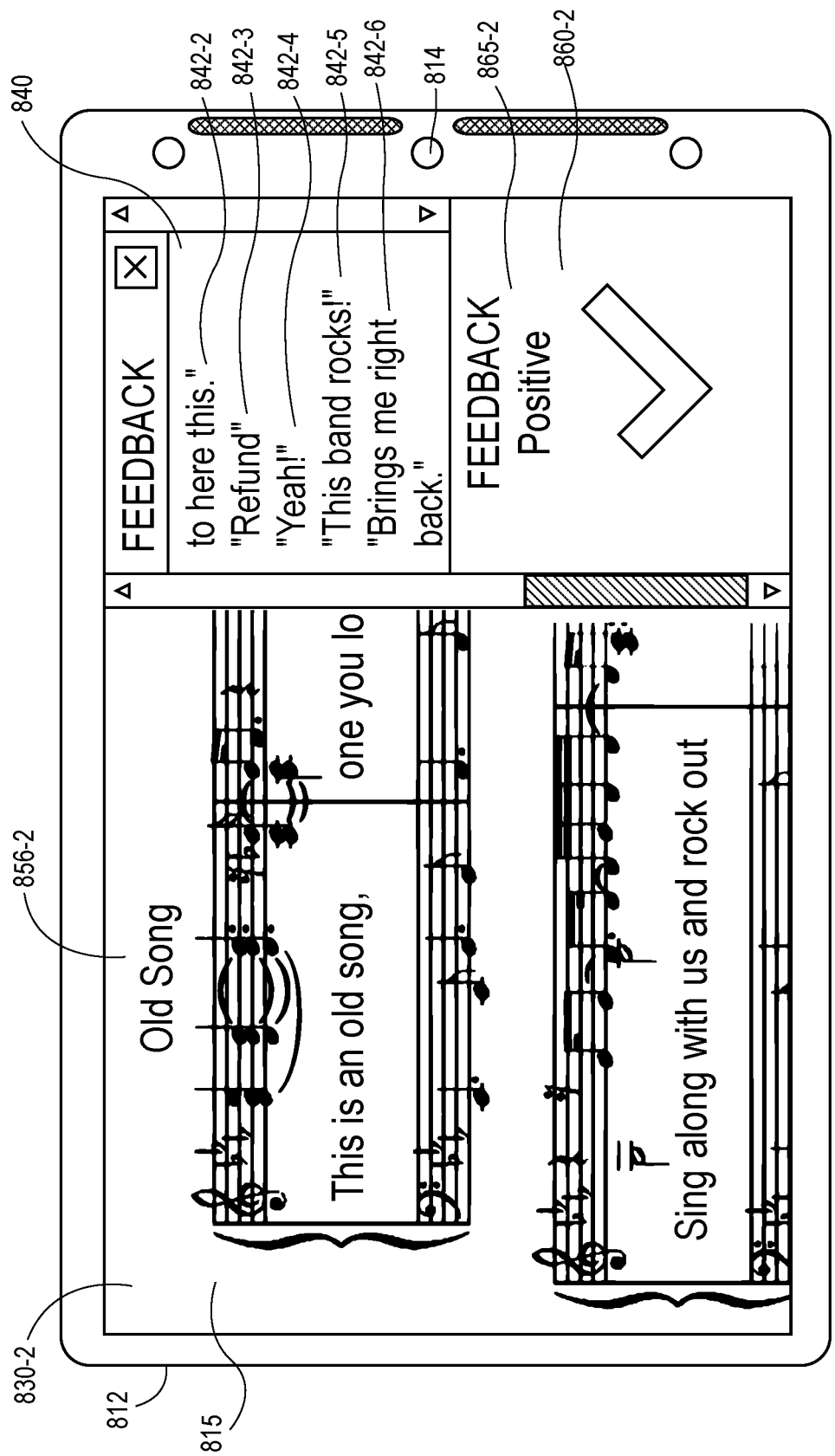

SELECTING MEDIA TO COMPLEMENT GROUP COMMUNICATION EXPERIENCES

BACKGROUND

Today, an ever-growing number of users of computer devices or systems engage in group communication experiences (or group chat experiences), such as chat sessions or message exchanges that are hosted by social networks, communications applications or services, text messaging platforms or other entities. In a group communication experience, multiple users may access a "chat room," a "meeting room," or another virtual space designated or set aside for members of a group, which may be open or by invitation only, and exchange electronic messages (e.g., chat messages) including one or more sets of text (e.g., alphanumeric characters or symbols) that are received from one or more users participating in a group chat experience, and transmitted to all of the users who are participating in the group chat experience. Messages or other sets of text may be entered by the users via user interfaces rendered on displays of the devices or systems used by the users to access a group chat experience, and displayed in the same user interfaces, e.g., in a common column or section of a display.

Recently, as messaging and communications platforms have evolved over time, participants in group communications experiences are able to communicate with one another, directly or indirectly, over an increasing number of platforms or devices in real time or in near-real time. As relatively recent concepts such as "working from home" or virtual happy hours continue to mature and grow in popularity, more and more users find themselves engaging in communications with one another in this manner, from various locations and at any times of day. One aspect of an in-person experience that group communications experiences have been unable to copy or replace, however, is the collective viewing or listening to media by multiple users at the same time, such as in response to one or more selections of media made by one of the users. Despite the advantages of efficiency and convenience that group communications experiences may provide, the benefits of being able to enjoy media together or simultaneously are currently lost to participants in such experiences.

BRIEF DESCRIPTION OF THE DRAWINGS

FIGS. 1A through 1K are views of aspects of one system for selecting media to complement group communication experiences in accordance with embodiments of the present disclosure.

FIGS. 5A through 5D are views of aspects of one system for selecting media to complement group communication experiences in accordance with embodiments of the present disclosure.

FIGS. 8A through 8E are views of aspects of one system for selecting media to complement group communication experiences in accordance with embodiments of the present disclosure.

DETAILED DESCRIPTION

As is set forth in greater detail below, the present disclosure is directed to complementing group communication experiences with selections of media. More specifically, the systems and methods of the present disclosure are directed to enabling participants in group communication experiences to view or listen to media entities that are selected for the group communication experiences as a whole, or for individual participants, based on the contents or contexts of the group communications experiences. For example, where participants in a group communication experience exchange messages via user interfaces associated with one or more computer devices or systems, a corpus of text included in such messages may be processed to determine whether the text includes any references to artists, titles, genres, eras or other attributes or descriptors within the corpus of text, or otherwise indicates a sentiment or a theme of the group communication experience, or of any individual participants in the group communication experience. Selections of media entities may be identified for the group communication experience, or for one or more individual users of the group communication experience, and played via one or more speakers or other output devices provided in association with devices or systems by which the individual users accessed the group communication experience. Alternatively, one or more individual media recommendations may be presented to each of such users, and such users may select media entities from such recommendations. Accordingly, the systems and methods of the present disclosure may enhance the quality and enrich the value of group communication experiences, thereby ensuring that users participating in the experiences enjoy greater levels of satisfaction and enjoyment from the experiences.

Figure 1A:
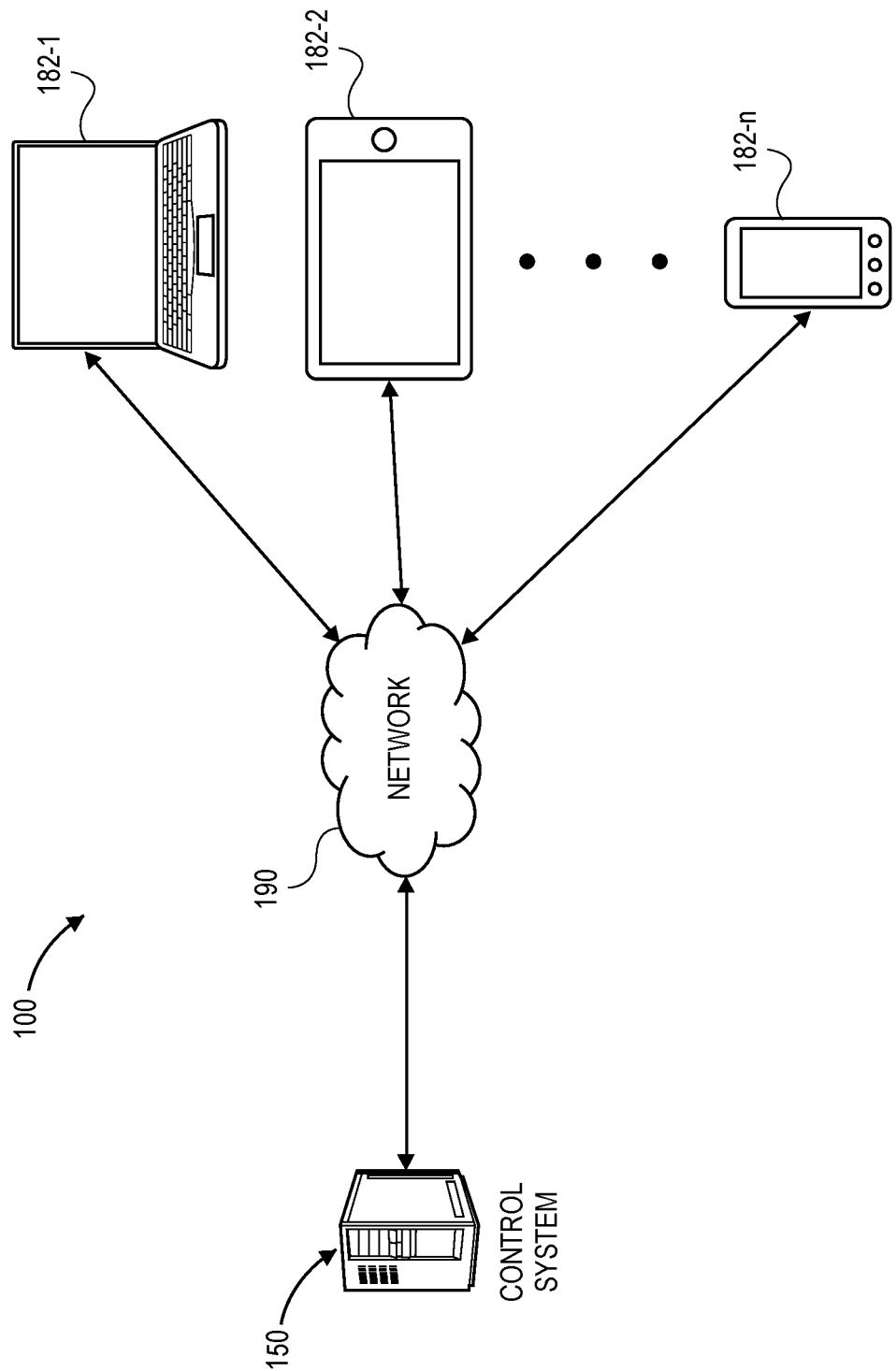

Referring to FIGS. 1A through 1K, views of aspects of one system for selecting media to complement group communication experiences in accordance with embodiments of the present disclosure are shown. As is shown in FIG. 1A, a system 100 includes a control system 150 connected to a plurality of devices 182-1, 182-2 . . . 182-n or other systems that are connected to one another over one or more networks 190, which may include the Internet in whole or in part. Each of the devices 182-1, 182-2 . . . 182-n may be associated with any number n of users (or listeners) who are participants in a group chat experience (or group communication experience). The device 182-1 is a laptop computer, while the device 182-2 is a table computer, and the device 182-n is a mobile device. However, the computer systems or devices that may be operated or utilized by participants in the group chat experience in accordance with the present disclosure are not limited to any of the devices or systems shown in FIG. 1A.

In some implementations, the control system 150 may host the group chat experience, and may establish two-way or bidirectional channels or connections (e.g., conference channels) with each of the devices 182-1, 182-2 . . . 182-n, thereby forming a "conference" by transmitting or receiving information or data along such communication channels, or in any other manner. In some implementations, the control system 150 may be a virtual participant in the group chat experience, and may establish any number of connections with other computer systems or devices that intend to join the group chat experience, or terminate connections with any of the devices 182-1, 182-2 . . . 182-n should any users of such devices 182-1, 182-2 . . . 182-n intend to depart the group chat experience. Alternatively, in some other implementations, the control system 150 may establish one-way or two-way or bidirectional channels or connection with any number of other devices not shown in FIG. 1A.

Figure 1B:
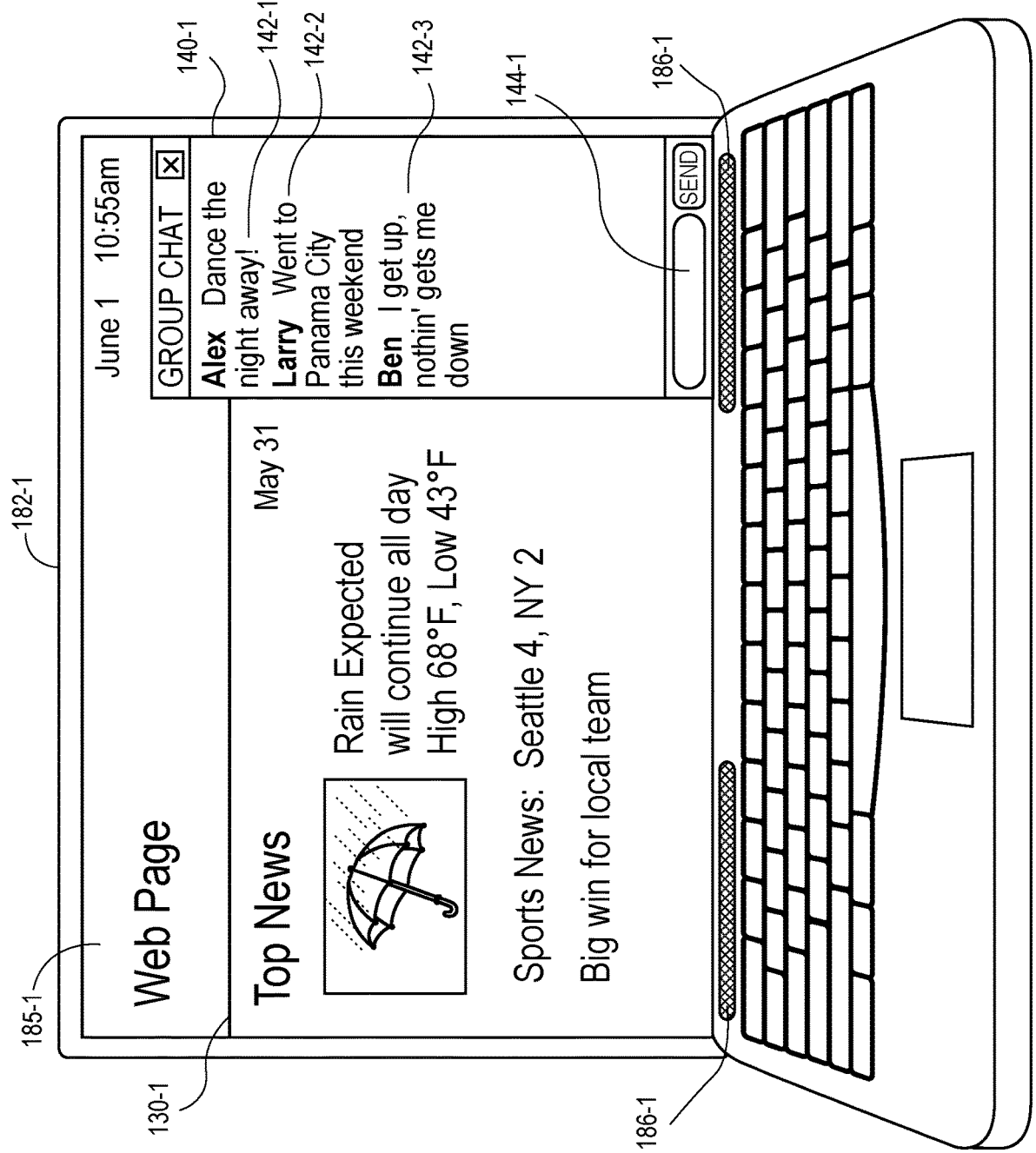

Users (e.g., listeners) engaged in a group chat experience may enter chat messages or other sets of text via user interfaces rendered by their respective devices, and such chat messages or other sets of text may be transmitted to all of such devices for display in the user interfaces. As is shown in FIG. 1B, the device 182-1 includes a display 185-1 and a pair of audio speakers 186-1. A user interface 130-1 is rendered on the display 185-1. The user interface 130-1 includes visual content of any type or form (e.g., advertisements, music, news, sports, weather, or other information), such as text, images, video files or any other information or data.

Additionally, the display 185-1 further includes a chat window 140-1 that may be sized, shaped or proportioned to appear within a selected or designated portion of the display 185-1, e.g., along a right edge of the display 185-1, or in any other location. The chat window 140-1 may be rendered by the device 182-1 in any manner. For example, code for rendering the user interface 130-1 or the chat window 140-1 may be retrieved from one or more memory components provided on the device 182-1, or transmitted to the device 182-1 by the control system 150 or from any other source, and the device 182-1 may execute the code to render the user interface 130-1 or the chat window 140-1 to appear on the display 185-1 accordingly. The code may be programmed in HTML or any other language, e.g., Java or JavaScript, and may be executed by a widget, an application programming interface (or "API"), or any other application or feature of the device 182-1.

As is shown in FIG. 1B, the chat window 140-1 includes a plurality of chat messages 142-1, 142-2, 142-3 provided by users (e.g., listeners) who are participating in the group chat experience, e.g., by way of user interfaces or other features provided on the devices 182-1, 182-2 . . . 182-n, as well as a text box 144-1 into which text of one or more chat messages may be entered. The chat message 142-1 was provided by a user (or listener) named Alex who wrote, "Dance the night away!" The chat message 142-2 was provided by a user (or listener) named Larry who wrote, "Went to Panama City this weekend." The chat message 142-3 was provided by a user named Ben who wrote, "I get up, nothin' gets me down."

Figure 1C:
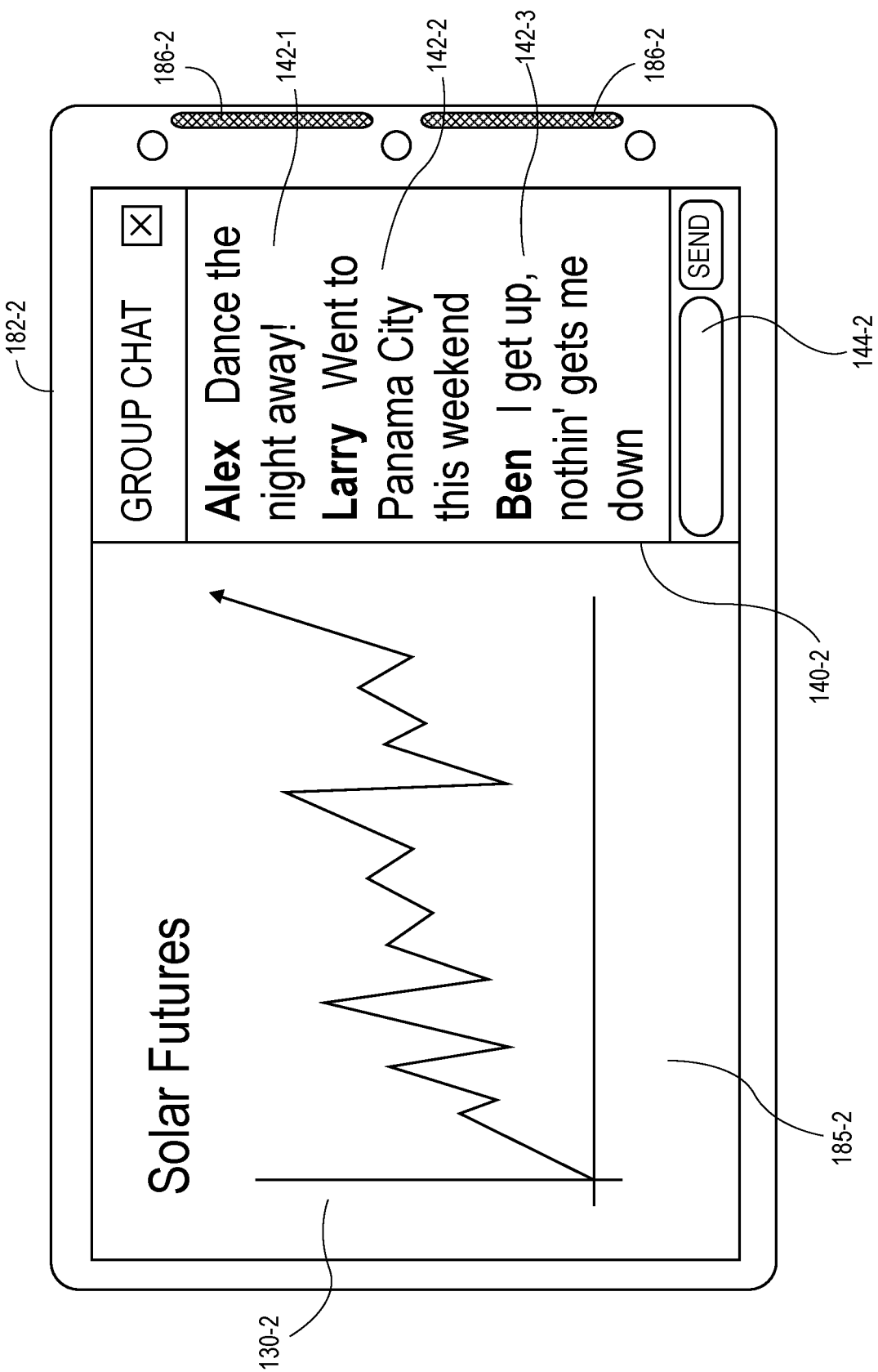

Similarly, as is shown in FIG. 1C, the device 182-2 includes a display 185-2 and a pair of audio speakers 186-2. A user interface 130-2 is rendered on the display 185-2 and includes visual content of any type or form (e.g., financial information or data), such as text, images, video files or any other information or data.

Additionally, the display 185-2 further includes a chat window 140-2 that may also be sized, shaped or proportioned to appear within a selected or designated portion of the display 185-2, e.g., along a right edge of the display 185-2, or in any other location. The chat window 140-2 may be rendered by the device 182-2 in any manner, e.g., by executing code retrieved from one or more memory components provided on the device 182-2, or transmitted to the device 182-2 by the control system 150 or from any other source. The chat window 140-2 also includes the plurality of chat messages 142-1, 142-2, 142-3 provided by the users (e.g., listeners) who are participating in the group chat experience, as well as a text box 144-2 into which text of one or more chat messages may be entered.

Figure 1D:
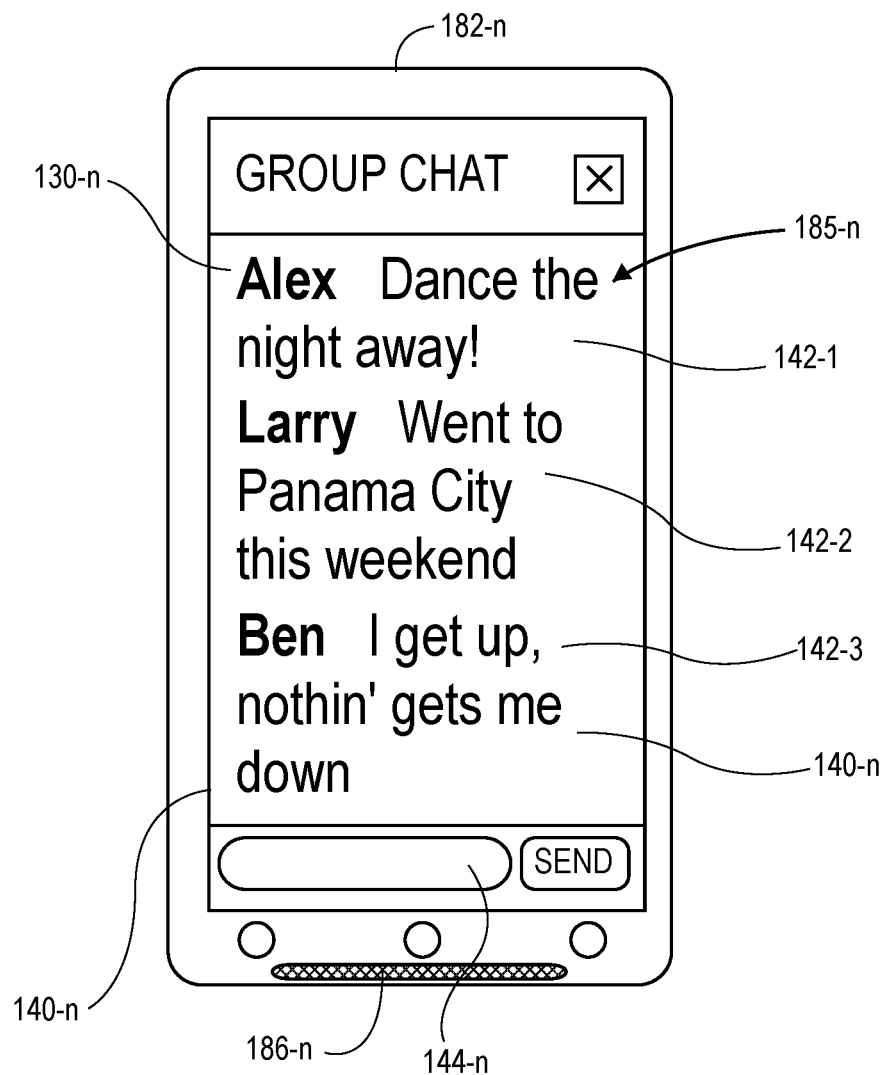

Likewise, as is shown in FIG. 1D, the device 182-n includes a user interface 130-n featuring a chat window 140-n. The chat window 140-n occupies a substantial portion or all of the visible portion of the display 185-n, and may also be rendered by the mobile device 182-n in any manner, e.g., by executing code retrieved from one or more memory components provided on the device 182-n, or transmitted to the device 182-n by the control system 150 or from any other source. The chat window 140-3 also includes the plurality of chat messages 142-1, 142-2, 142-3 provided by the users (e.g., listeners) who are participating in the group chat experience, as well as a text box 144-n into which text of one or more chat messages may be entered.

Figure 1E:
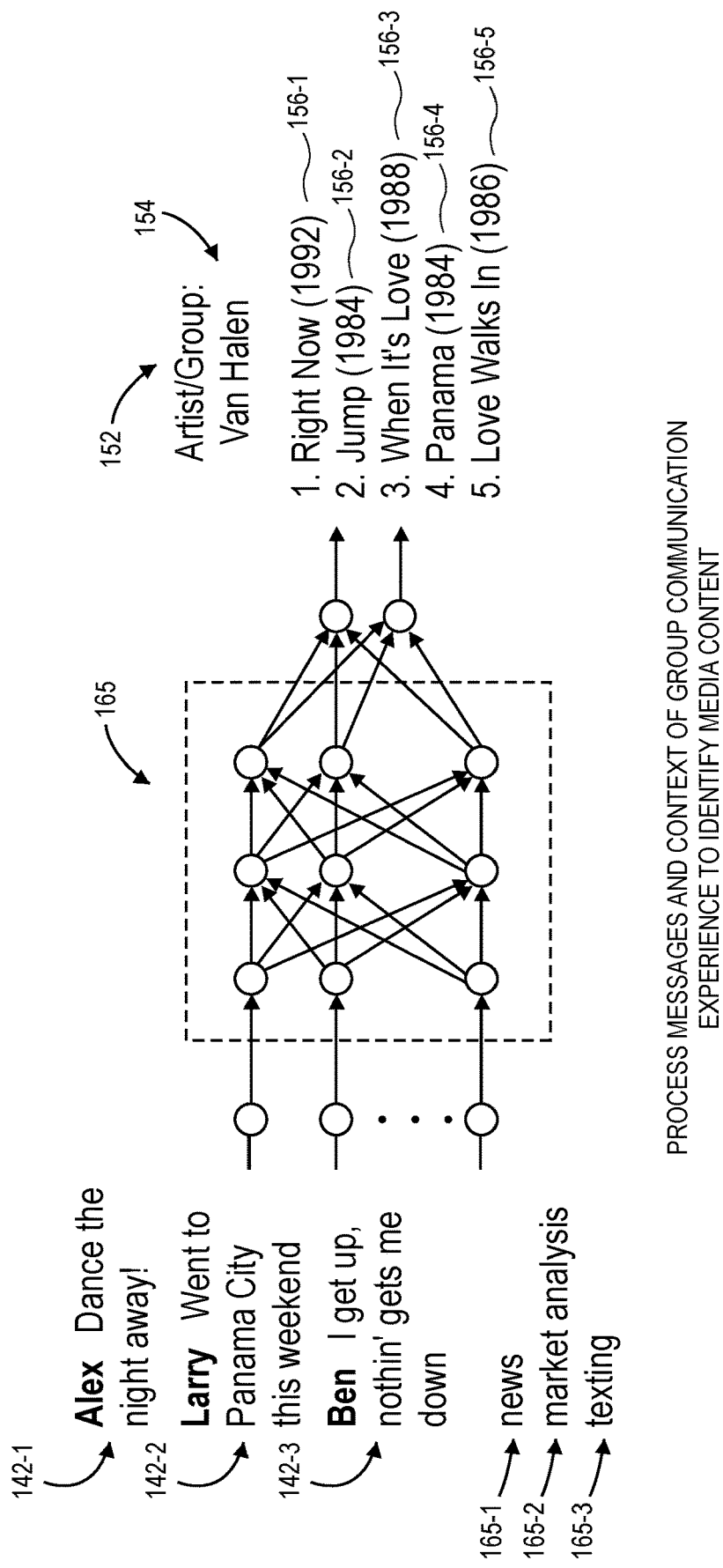

In accordance with implementations of the present disclosure, chat messages received from users participating in a group communication experience (e.g., a group chat experience) may be processed to determine whether the text included in such messages references any artists, titles, genres, eras or other attributes or descriptors of any media entities, or to identify any sentiments (or emotions or opinions) or themes that may be expressed in the text, as well as a theme of the group communication experience. As is shown in FIG. 1E, the chat messages 142-1, 142-2, 142-3 are provided as one or more inputs, either individually or collectively as a corpus of text, to a machine learning system 165 operated by the control system 150 that hosts the group chat experience or on any other device or system. The machine learning system 165 may be trained to determine whether the corpus of text includes names of any specific singers, groups, bands, concerts, albums or songs, or includes any lyrics or sets of text that are similar to lyrics, as well as any references to genres, eras or other classifications of media entities, such as "'90s hip-hop," "jazz," "soul" or "classic rock." The machine learning system 165 may also be trained to identify a sentiment (or emotions or opinions) expressed within the corpus of text or within individual chat messages 142-1, 142-2, 142-3, or a theme of the corpus of text or any of the individual chat messages 142-1, 142-2, 142-3, and associate that sentiment or that theme with the group chat experience as a whole, or with one of the users (e.g., listeners) that authored a respective one of the chat messages 142-1, 142-2, 142-3 identified as expressing the sentiment or from which the theme was identified. Alternatively, the chat messages 142-1, 142-2, 142-3 need not be processed according to any machine learning or artificial intelligence techniques, and may instead be processed in any other manner in order to determine whether the chat messages 142-1, 142-2, 142-3 refer to any media entities, to determine whether the chat messages 142-1, 142-2, 142-3 express any sentiments (or emotions or opinions), or to identify any themes of the chat messages 142-1, 142-2, 142-3 or the group chat experience as a whole.

As is further shown in FIG. 1E, one or more outputs 152 received from the machine learning system 165 may be processed to determine that the chat messages 142-1, 142-2, 142-3 relate to an artist or group 154, viz., the American rock band Van Halen, and a plurality of media titles 156-1, 156-2, 156-3, 156-4, 156-5 by the artist or group 154 may be identified accordingly. For example, the chat message 142-1 includes both a title of and a line from a 1979 song by the artist or group 154. The chat message 142-2 also includes a reference to a geographic location, viz., Panama City, that is consistent with a title of a 1984 song by the artist or group 154, viz., "Panama." The chat message 142-3 further includes a line from a 1983 song by the artist or group 154, viz., "Jump." Alternatively, the one or more outputs 152 may identify multiple artists or groups, and need not be limited to identifying media titles from a single artist or group.

Accordingly, based on a corpus of text including at least some of the chat messages 142-1, 142-2, 142-3 of the group chat experience, an interest in or preference for the artist or group 154 may be determined or predicted. Therefore, in accordance with the present disclosure, a list of media entities, viz., the media titles 156-1, 156-2, 156-3, 156-4, 156-5 by the artist or group 154 may be identified. The media title 156-1 is a 1992 song entitled "Right Now," while the media title 156-2 is a 1984 song entitled "Jump," the media title 156-3 is a 1988 song entitled "When It's Love," the media title 156-4 is the song referenced in the chat message 142-2, and the media title 156-5 is a 1986 song entitled "Love Walks In."

In some implementations, the list of media titles 156-1, 156-2, 156-3, 156-4, 156-5 may be ranked or scored on any subjective or objective basis, such as a similarity or a relationship between one or more of the media titles 156-1, 156-2, 156-3, 156-4, 156-5 and any attributes of the users (e.g., listeners) of the group chat experience. For example, the media titles 156-1, 156-2, 156-3, 156-4, 156-5 may be ranked or scored based on their respective relationship to any sentiments (or emotions or opinions) expressed in one or more of the chat messages 142-1, 142-2, 142-3, their respective relationship to a theme of the group chat experience, or their particular relevance or appropriateness for any of the users that provided the chat messages 142-1, 142-2, 142-3, or other users. In some implementations, the media titles 156-1, 156-2, 156-3, 156-4, 156-5 that reference a topic of interest to any of the users of the group chat experience may be ranked or scored more highly than chat messages that do not reference any topics of interest to the users, while media titles 156-1, 156-2, 156-3, 156-4, 156-5 that were listened to or purchased by a user may be ranked or scored more highly than media titles that were not listened to or purchased by the user. A level or measure of appropriateness or relevance of a specific one of the media titles 156-1, 156-2, 156-3, 156-4, 156-5 to a specific listener may be calculated or otherwise determined on any basis, for any number of the media titles 156-1, 156-2, 156-3, 156-4, 156-5 and for any number of users, and based on any attributes of such users, which may be determined based at least in part on any chat messages received from such users, or on any other basis.

Figure 1F:
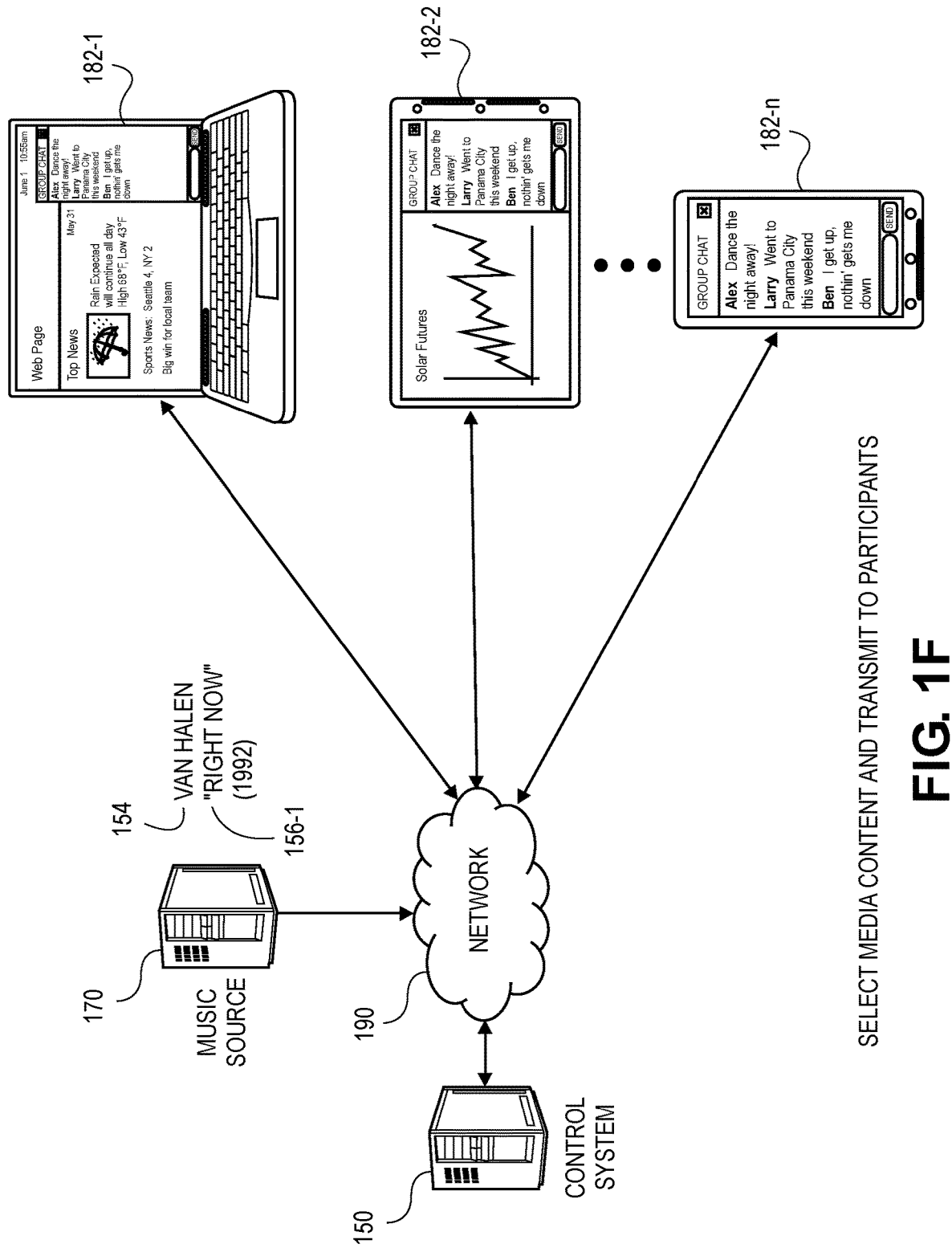

After the media titles 156-1, 156-2, 156-3, 156-4, 156-5 have been ranked or scored, any number of the media titles 156-1, 156-2, 156-3, 156-4, 156-5 may be selected and transmitted to the devices 182-1, 182-2 . . . 182-n. For example, as is shown in FIG. 1F, one or more connections may be established between the control system 150 or any of the devices 182-1, 182-2 . . . 182-n and a music source 170 (e.g., a music catalog, repository or streaming service) having access to one or more of the media titles 156-1, 156-2, 156-3, 156-4, 156-5, viz., the media title 156-1, and the control system 150 may cause the media title 156-1 to be transmitted to the devices 182-1, 182-2 . . . 182-n, and played to users participating in the group chat experience.

Figure 1G:
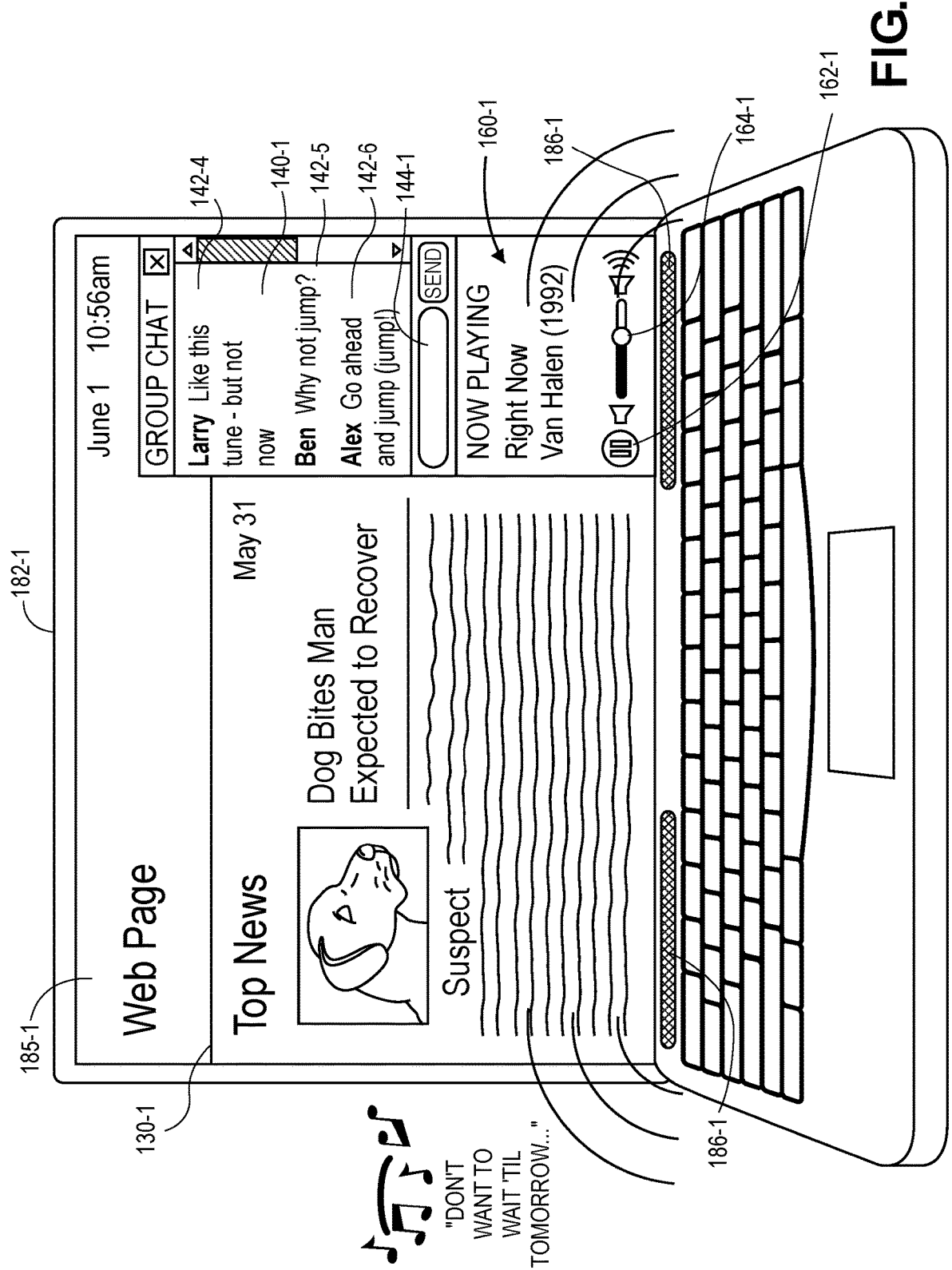

As is shown in FIG. 1G, as the media title 156-1 is played by the device 182-1, the user interface 130-1 rendered on the display 185-1 by the device 182-1 is updated to include additional visual content, and the chat window 140-1 is updated to include chat messages 142-4, 142-5, 142-6 that have recently been received from users participating in the group chat experience. The chat message 142-4 was provided by the user (or listener) named Larry who wrote, "Like this tune—but not now," regarding the media title 156-1. The chat message 142-5, was provided by the user (or listener) named Ben, respectively, who questioned the selection of the media title 156-1 over the media title 156-2, by writing "Why not Jump?" The chat message 142-6 was provided by the user (or listener) named Alex, who followed the chat message 142-5 by writing a line from the media title 156-2, "Go ahead and jump (jump!)"

Additionally, the display 185-1 further includes a media controls window 160-1 provided adjacent to or in association with the chat window 140-1. The media controls window 160-1 identifies the media title 156-1 and the artist or group 154, and also includes a selectable element or feature 162-1 for playing or pausing the playing of the media title 156-1, as well as a slider 164-1 or another adjustable feature for setting or modifying a level of volume of the media title 156-1 being played by the device 182-1 during the group chat experience.

Figure 1I:
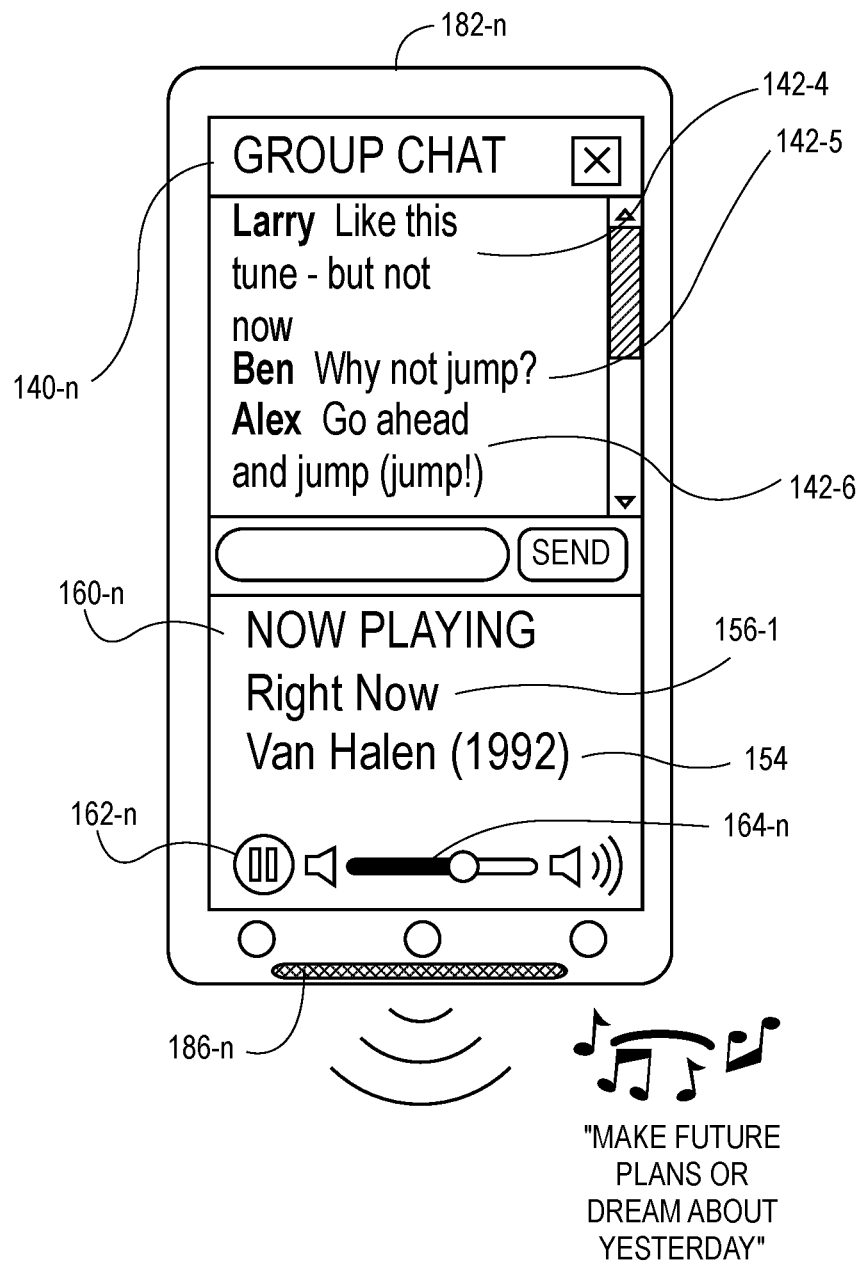

Similarly, as is shown in FIG. 1H, as the media title 156-1 is played by the device 182-2, the user interface 130-2 rendered on the display 185-2 by the device 182-2 is updated to include additional visual content, and the chat window 140-2 is updated to include the chat messages 142-4, 142-5, 142-6. Additionally, the display 185-2 further includes a media controls window 160-2 provided adjacent to or in association with the chat window 140-2 which identifies the media title 156-1 and the artist or group 154, and also includes a selectable element or feature 162-2 for playing or pausing the playing of the media title 156-1, as well as a slider 164-2 or another adjustable feature for setting or modifying a level of volume of the media title 156-1 being played during the group chat experience. Likewise, as is shown in FIG. 1I, as the media title 156-1 is played by the device 182-n, the chat window 140-n is updated to include the chat messages 142-4, 142-5, 142-6, and a media controls window 160-n identifying the media title 156-1 and the artist or group 154 is provided adjacent to or in association with the chat window 140-n. The media controls window 160-n also includes a selectable element or feature 162-n for playing or pausing the playing of the media title 156-1, as well as a slider 164-n or another adjustable feature for setting or modifying a level of volume of the media title 156-1 being played by the device 182-n during the group chat experience.

Figure 1J:
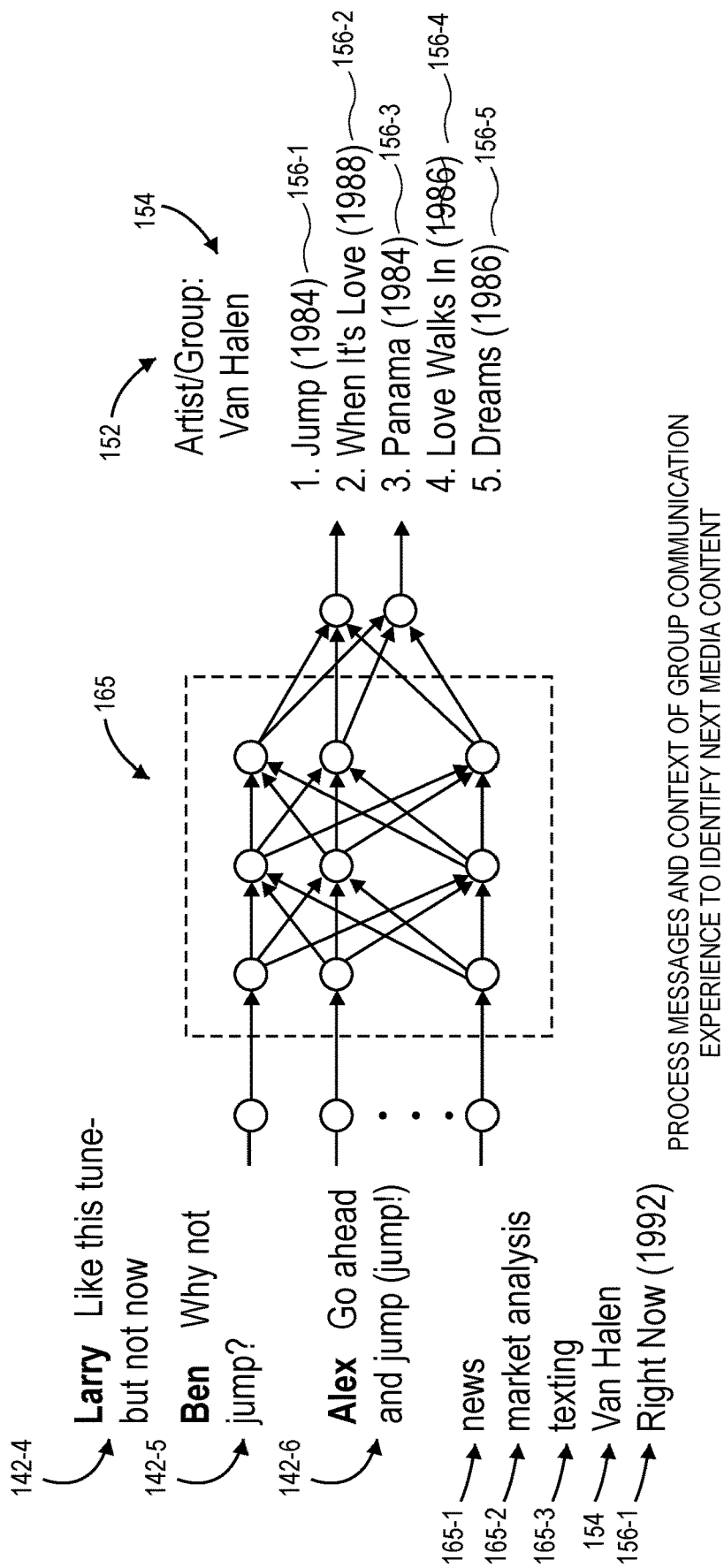

In accordance with implementations of the present disclosure, selections of artists or groups, or media entities by such artists or groups, may be updated or modified based on feedback received from participants in a group communication experience, as well as activities being undertaken by the participants. As is shown in FIG. 1J, one or more inputs including the chat messages 142-4, 142-5, 142-6 are provided to the machine learning system 165 operated by the control system 150 that hosts the group chat experience or on any other device or system. As is further shown in FIG. 1J, the inputs also include identifiers 165-1, 165-2, 165-3 of activities being undertaken by one or more participants of the group chat experience, and the artist or group 154 and the media title 156-1 then being played by each of the devices 182-1, 182-2 . . . 182-n. For example, the identifier 165-1 indicates that one of the users, e.g., the user of the device 182-1, is viewing news during the group chat experience, while the identifier 165-2 indicates that another of the users, e.g., the user of the device 182-2, is performing market analysis, and the identifier 165-3 indicates that yet another of the users, e.g., the user of the device 182-n, is engaged in text messaging or like activities. Alternatively, any number of other identifiers of activities being undertaken by users of any the devices 182-1, 182-2 . . . 182-n, e.g., viewing or listening to media programs, browsing web pages, performing word processing or spreadsheet operations, transmitting or receiving electronic messages, such as by an E-mail client, or any other activities, may be provided to the machine learning system 165 as inputs. Moreover, to the extent that different media titles are being played by different devices participating in the group chat experience, identifiers of such titles, and the artists or groups associated with such titles, may also be provided to the machine learning system 165 as inputs.

As is further shown in FIG. 1J, one or more outputs 152 received from the machine learning system 165 may be processed to update the list of media titles, viz., to remove the media title 156-1 from the list, based on the feedback received in the chat messages 142-4, 142-5, 142-6, and to add a new media title 156-6 to the list, viz., a 1986 song entitled "Dreams." Alternatively, any other media titles by the artist or group 154, or by any other artist or group, may be identified based on the outputs 152.

Figure 1K:
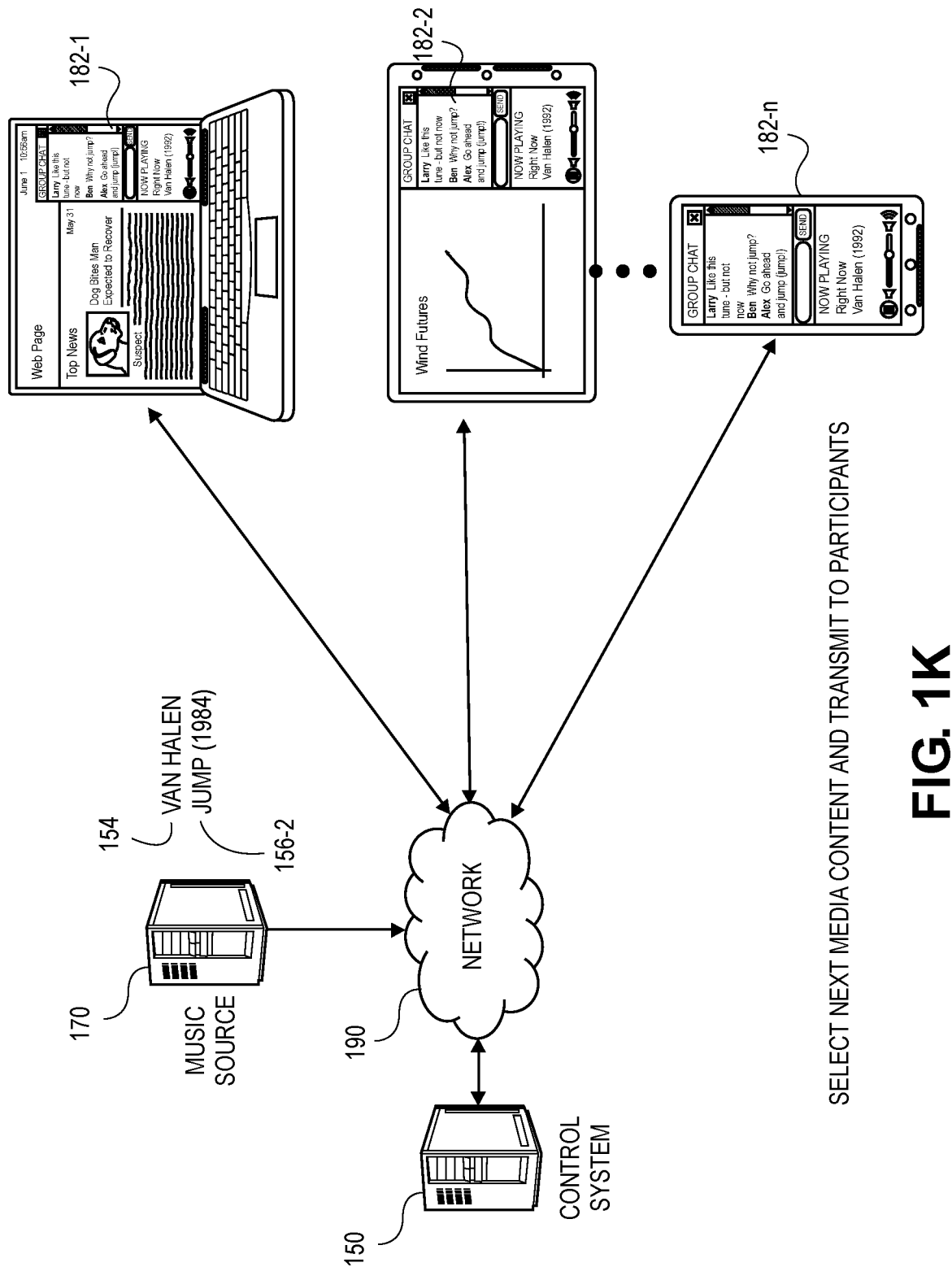

As is shown in FIG. 1K, the control system 150 may cause the media title 156-2, viz., the 1984 song "Jump," to be transmitted to the devices 182-1, 182-2 . . . 182-n of the users participating in the group chat experience. For example, the media title 156-2 may be stored or maintained on the same music source 170 from which the media title 156-1 was stored or maintained. In some implementations, however, the control system 150 may establish one or more connections with another media source (e.g., another music source), as necessary.

Media entities may be identified for one or more of the users participating in the group chat experience based on any chat messages received from such users for as long as the group chat experience continues, such as by providing text of the chat messages to the machine learning system 165 as inputs, optionally along with any other inputs, which may include but need not be limited to identifiers of one or more activities being undertaken by the users participating in the group chat experience, or media titles that have been played or are being played by devices of such users.

Accordingly, the systems and methods of the present disclosure may be utilized to identify media entities of any type or form that may complement or be played during one or more group communication experiences, such as a group chat experience, between users of multiple devices in different locations. The group communication experience may be hosted by a control system, a mixing system, a conference system, or a like system, and the media entities may be identified based on contents of a corpus of text including chat messages received from one or more of the users and transmitted to all of the users. In some implementations, media entities may be identified based on any references to artists, titles, genres, eras or other attributes or descriptors included in a corpus of text received from the users, any sentiments (or emotions or opinions) expressed within the corpus of text, or any themes represented in the corpus of text. In some implementations, the same media entities may be provided to each of the devices of users participating in a group communication experience for playing during the group communication experience. In some other implementations, however, different media entities may be identified for different users participating in the group communication experience and transmitted to devices associated with such users accordingly. Moreover, in some implementations, recommendations of media entities may be presented to the users in one or more user interfaces.

The media entities that may be identified and transmitted to devices of users in a group communication experience may include songs, playlists, podcasts or other media that may be "live" or pre-recorded (e.g., "on demand"), such as any advertisements, music, news, sports, weather, or other programming. The media entities may be ranked or scored on any subjective or objective basis, and selected for each of the users of the group communication experience, or for individual users, accordingly.

Any number of users participating in a group communication experience may provide chat messages or other sets of text, or decline to provide any such chat messages or text, in accordance with a group communication experience. For example, a participant in a group communication experience may be an active contributor of one or more chat messages during the group communication experience, or a passive contributor (e.g., a lurker) who receives chat messages from other users during the group communication experience but does not contribute any chat messages to the group communication experience. Furthermore, a number of users (e.g., listeners) that participate in a group communication experience by providing or receiving chat messages or other text and any complementary media entities may be any number, such as several, dozens, hundreds, thousands or more listeners, and may vary over a course of the group communication experience, as one or more users may depart or join the experience after the experience has begun. Moreover, chat messages may be displayed within user interfaces on any number of devices of any of such listeners, along with one or more windows or other features for controlling the playing of media content. Alternatively, where one or more of such devices is not equipped with a display, chat messages received by such devices may be spoken aloud, e.g., at a volume level different from that of a voice of a creator or any other media content then being played by such devices.

In some implementations, chat messages or other text may be processed to determine any sentiments (or emotions or opinions) of a group communication experience or one or more individuals that may be expressed in such chat messages or text, to determine whether the group communication experience is consistent with one or more themes, or to determine whether any of the chat messages includes objectionable (e.g., obscene, indecent, profane or divisive) content. For example, one or more of chat messages may be provided as inputs to a machine learning algorithm (e.g., an artificial neural network) trained to identify any words represented in the chat messages or to determine whether any of such words express a sentiment, are consistent with a theme, or include or constitute objectionable content. Alternatively, or additionally, other types of machine learning algorithms, systems or techniques, or multiple machine learning algorithms, systems or techniques, may be utilized to determine sentiments, identify themes or evaluate chat messages for objectionable content, or determine any other attributes of the chat messages. Moreover, in some implementations, whether a chat message includes any objectionable content may be determined in any other manner, including but not limited by one or more algorithms, systems or techniques that need not rely on machine learning or like applications. For example, in some implementations, a set of words that has been identified and designated as objectionable in nature, e.g., words that are known to be or are designated as either obscene, indecent, profane or divisive. When a set of words is identified in a chat message received from a creator or a listener, one or more of the words may be compared to a set of words that has been identified and designated as objectionable in nature. In some implementations, whether a set of words in a chat message is objectionable may be determined based on a number of words in the set of words that have been identified and designated as objectionable in nature.

In some implementations, chat messages may be processed to determine a sentiment of a user (or a listener) that provided the chat messages, or one or more evaluations, attitudes, appraisals, emotions, moods or judgments represented within the chat messages. For example, a sentiment (or any evaluations, attitudes, appraisals, emotions, moods or judgments) may be identified or classified with respect to a chat message as a whole, or with respect to one or more individual portions (e.g., passages, paragraphs or sentences) of the chat message. When analyzing chat messages received from a user (or a listener), or a portion thereof, in order to identify a sentiment expressed therein, the chat messages may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment (or an emotion or an opinion) of a chat message may be identified broadly in terms of polarity, i.e., whether the chat message is generally positive, negative or neutral, or in terms of grades or degrees. For example, a chat message may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, e.g., emotions, opinions or sentiments regarding the economy, sports or politics.

In order to identify and obtain a sentiment (or an emotion or an opinion) from a chat message, text or any data associated with the chat message may be analyzed in any manner. For example, one or more machine learning algorithms or techniques may be provided to determine a sentiment from a chat message by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the chat message, and to identify any pertinent keywords maintained therein, which may be analyzed and associated with one or more emotions or sentiments thereof.

Additionally, text of messages transmitted or received during a group communication experience may be processed to identify a theme associated with any of such messages, or with the group communication experience as a whole. For example, a theme may be identified from a corpus of text including one or more messages exchanged during a group communications experience by topic modeling (e.g., algorithms or methods such as one or more latent Dirichlet allocations, matrix factorizations, latent semantic analyses, pachinko allocation models, or others). In some implementations, a theme may be identified by counting words (including any known synonyms) appearing within a corpus of text, or defining groups of words that best represent the corpus of text. In some implementations, a theme may be identified based on an extent to which words are repeated within the corpus of text, or a frequency with which such words appear, as well as how such words are used within individual chat messages or the corpus of text as a whole. A theme may also be identified by comparing and contrasting different chat messages or other portions of a corpus of text, or based on text not actually included within the corpus of text. A theme may also be identified based on any metaphors or analogies included within any number of chat messages, or a corpus of text as a whole, as well as based on any transitions or connections between chat messages or other portions of the corpus of text.

Alternatively, a theme may be identified from a corpus of text, or from one or more chat messages, on any other basis. Furthermore, a theme may be identified at any point in time during a group communication experience, or after any number of messages have been transmitted or received in accordance with the group communication experience. Themes may be identified based on any number of the messages received from any number of the participants, or based on all of the messages received from all of the participants.

In addition to references, attributes or descriptors of media included in a corpus of text, as well as any sentiments identified within the corpus of text, or themes of the corpus of text, a media entity may be identified for one or more users participating in a group communication experience based on activities being undertaken by such users during the group communication experience, e.g., as one or more inputs to or other factors considered by one or more machine learning algorithms, or by any other techniques.

Moreover, in some implementations, a media entity may be identified for one or more users participating in a group communication experience with serendipity, or with a goal of engaging the users with humor. For example, where one user participating in a group communication experience enters a chat message including a set of text of "how will I know?" one or more of the systems or methods disclosed herein may identify or select the iconic 1985 song by Whitney Houston of the same name, which also includes the set of text in the chorus, and recommend the song to one or more of the users in the group communication experience, or cause the song to be played by devices of such users. In some implementations, the song may be caused to begin playing at a beginning of the song, at a chorus of the song, or at any other time during the song. Similarly, where one user participating in a group communication experience enters a chat message including a set of text of "what do you mean?" one or more of the systems or methods disclosed herein may identify the catchy 2015 song by Justin Bieber of the same name, which also includes the set of text in at least two dozen instances, and recommend the song to one or more of the users in the group communication experience, or cause the song to be played by devices of such users. For example, one or more portions of a song may be played to users in its original form, or, alternatively, another form, such as an a cappella or an instrumental form.

As used herein, the term "media entity" may refer to media content of any type or form (e.g., audio and/or video) that may be recorded, stored, maintained or transmitted in one or more files, such as a movie, podcast, a song (or title), a television show, or any other media programs (e.g., audio and/or video programs). The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

As used herein, the term "group communication experience" (or "group chat experience") may refer to a session or period of time during which electronic messages (e.g., chat messages) are received from devices of one or more users of a group, and transmitted to devices of each of the users of the group. The messages may include any sets of text that are entered into user interfaces rendered on devices of users, e.g., via special-purpose applications dedicated to a messaging service (e.g., an instant messaging service, a chat message service, short or multimedia messaging services, or another communications service), general-purpose applications such as browsers, or any other applications. The messages may also be received from one or more of the plurality of users, and transmitted over one or more networks to devices associated with each of the plurality of users for display on the user interfaces rendered by such devices. The messages may include not only text but also one or more emoji or other characters or symbols, or any other information or data that may be received from or transmitted to users in a group chat experience, such as image files, video files, audio files, multimedia files, or any other files. Alternatively, or additionally, the messages may include one or more hyperlinks, such as Uniform Resource Identifiers (URI) or Uniform Resource Locators (URL) that may be accessed by selections or other interactions to retrieve additional information or data during the group communication experience.

Media entities that may accompany a group communication experience include, but need not be limited to, one or more songs or other music files from a music catalog, repository or streaming service, one or more advertisements of items, goods or services, or one or more news, sports or weather programs, which may be live or previously recorded, as well as voices of a creator or one or more guests, such as musicians, celebrities, personalities, athletes, politicians, or artists, or any listeners to a media program. A control system, or any associated conference systems, broadcast systems or mixing systems, may establish or terminate connections with a creator, with any sources of media content, or with any number of listeners, to compile and efficiently transmit information or data of the group communication experience including not only sets of text but also media content over digital channels (e.g., web-based or application-based), to any number of systems or devices of any form.

One or more of the embodiments disclosed herein may overcome limitations of existing systems and methods for hosting or providing group communication experiences. Unbounded by traditional frequency bands or broadcast protocols, the systems and methods of the present disclosure may receive designations of media content, and the media content may be transmitted over one or more networks to any number of listeners in any locations and by way of any devices. Creators or hosts of group communication experiences may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
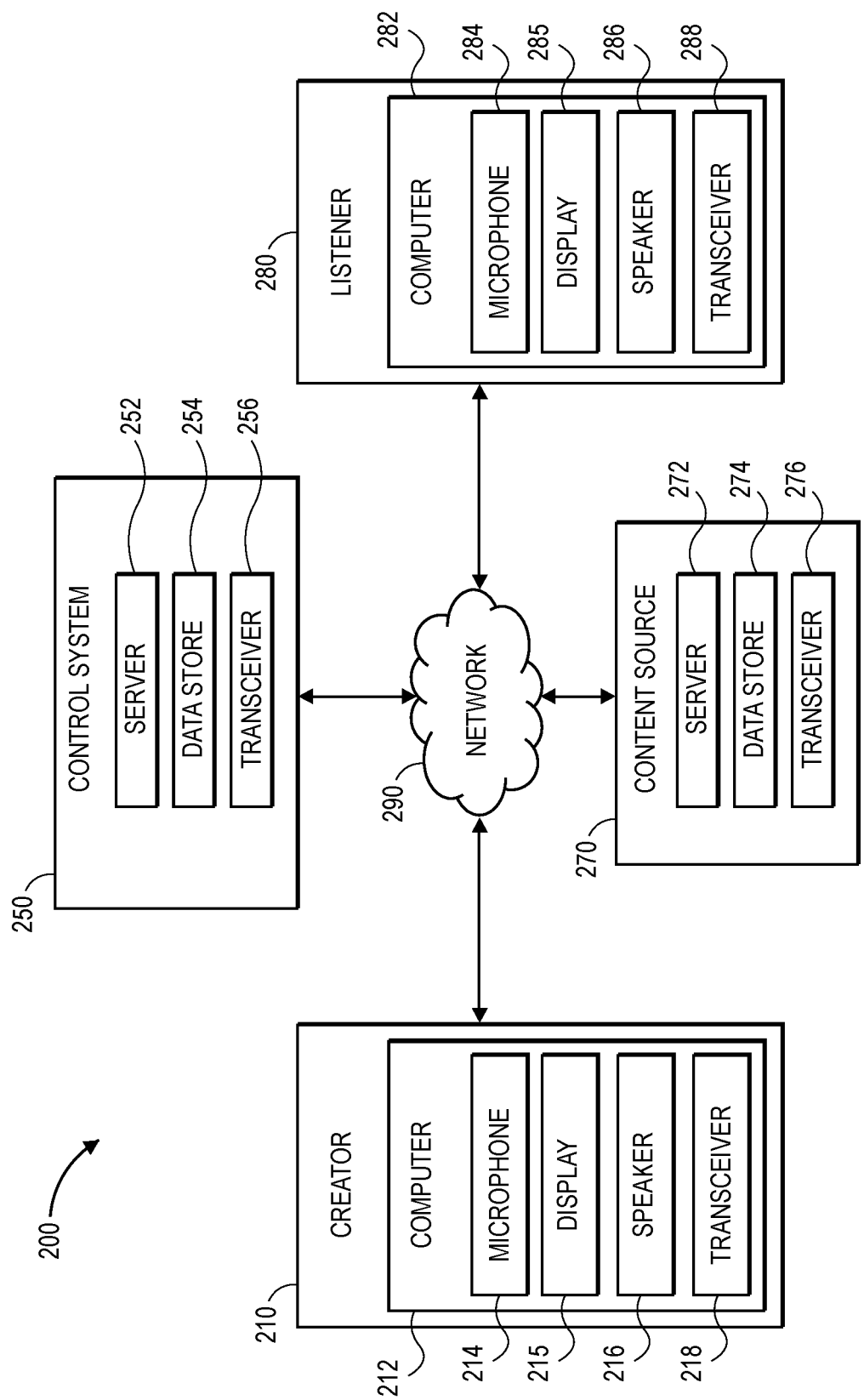
FIGS. 2A and 2B are block diagrams of components of one system for selecting media to complement group communication experiences in accordance with embodiments of the present disclosure.
Figure 2B:
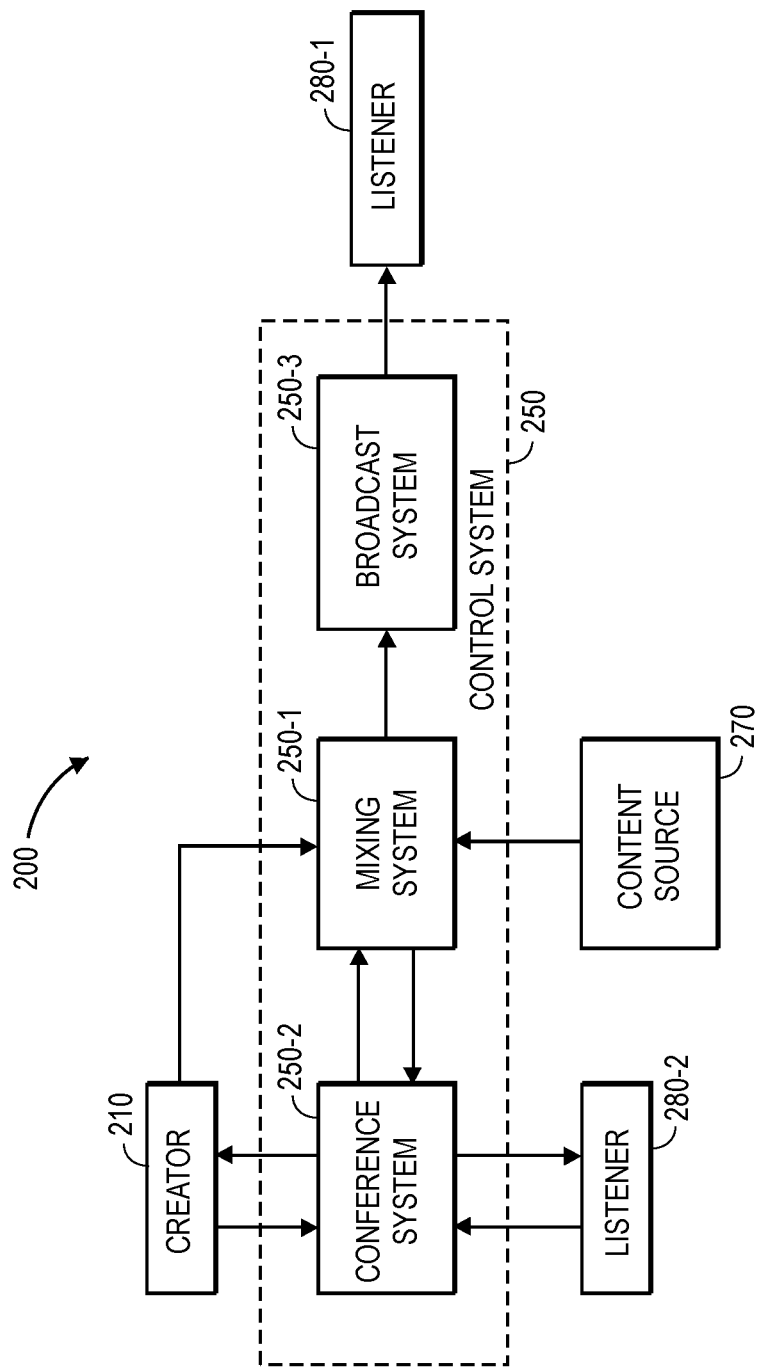

Referring to FIGS. 2A and 2B, block diagrams of components of one system 200 for selecting media to complement group communication experiences in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1K.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, or generating media content, and providing the media content to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as ear buds, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fee. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, control systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
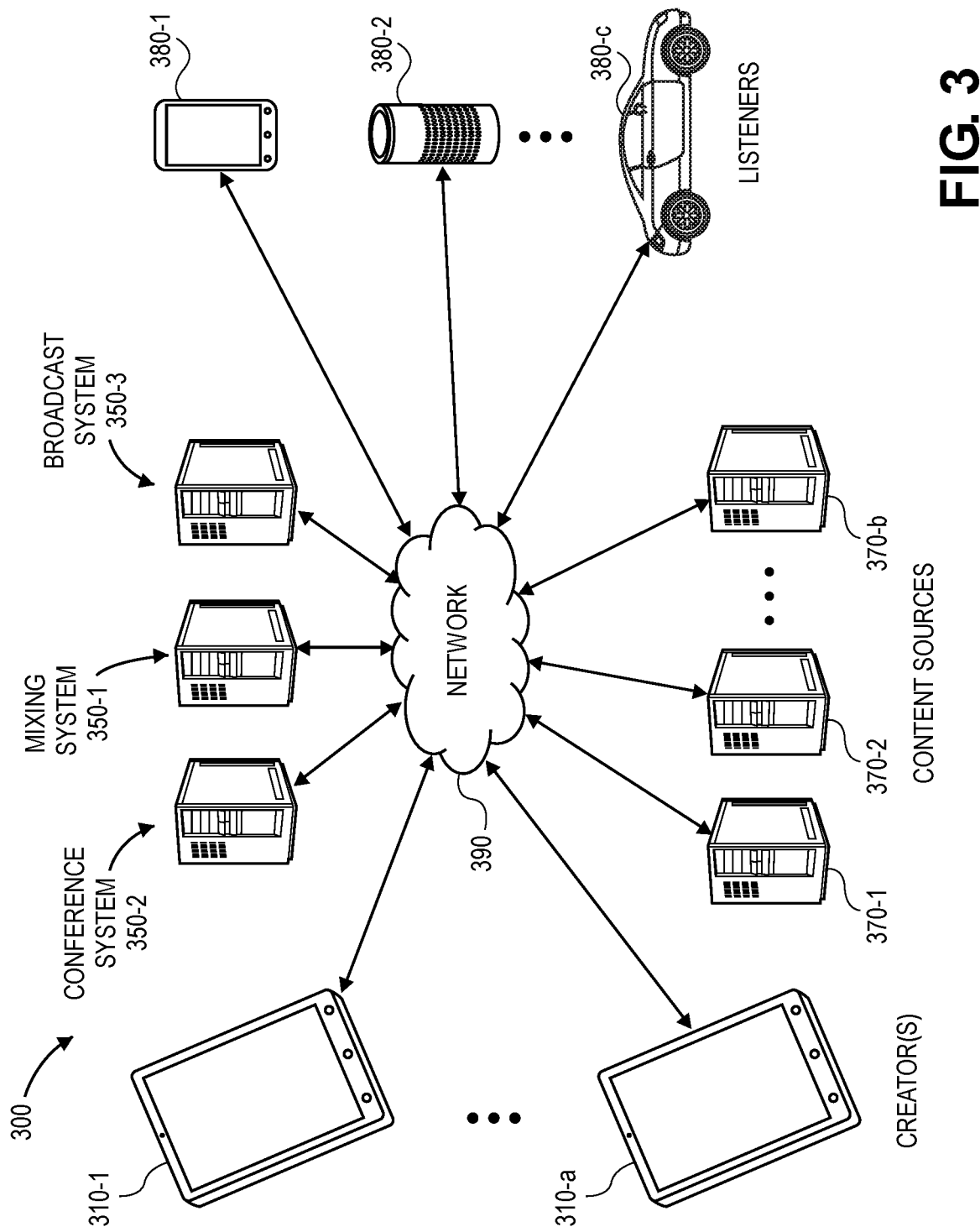
FIG. 3 is a view of aspects of one system for selecting media to complement group communication experiences in accordance with embodiments of the present disclosure.

Referring to FIG. 3, a view of aspects of one system for selecting media to complement group communication experiences in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1K. As is shown in FIG. 3, the system 300 includes computer systems or devices of a plurality of creators 310-1 . . . 310-*a*, a mixing system 350-1, a conference system 350-2, a broadcast system 350-3, a plurality of content sources 370-1, 370-2 . . . 370-*b* and a plurality of listeners 380-1, 380-2 . . . 380-*c* that are connected to one another over a network 390, which may include the Internet in whole or in part.

The creators 310-1 . . . 310-*a* may operate a computer system or device having one or more microphones, an interactive display, one or more speakers, one or more processors and one or more transceivers configured to enable communication with one or more other computer systems or devices. In some implementations, the creators 310-1 . . . 310-*a* may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a* may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 ... 370-*b* may be servers or other computer systems having media content stored thereon, or access to media content, that are configured to transmit media content to the creators 310-1 ... 310-*a* or any of the listeners 380-1, 380-2 ... 380-*c* in response to one or more instructions or commands from the creators 310-1 ... 310-*a* or the mixing system 350-1. The media content stored on or accessible to the content sources 370-1, 370-2 ... 370-*b* may include one or more advertisements, songs or media files, news programs, sports programs, weather reports or any other media files, which may be live or previously recorded. The number of content sources 370-1, 370-2 ... 370-*b* that may be accessed by the mixing system 350-1, or the types of media content stored thereon or accessible thereto, is not limited.

The listeners 380-1, 380-2 ... 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 ... 310-*a*, with any of the content sources 370-1, 370-2 ... 370-*b*, or with any of the listeners 380-1, 380-2 ... 380-*c*, as necessary, to compile and seamlessly transmit media programs over digital channels (e.g., web-based or application-based), to devices of the creators 310-1 ... 310-*a* or the listeners 380-1, 380-2 ... 380-*c* in accordance with a broadcast plan, or subject to the control of the creators 310-1 ... 310-*a*. Furthermore, in some implementations, one or more of the listeners 380-1, 380-2 ... 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 ... 380-*c*, the mixing system 350-1 may terminate one of the one-way channels with one of the listeners 380-1, 380-2 ... 380-*c*, and cause the conference system 350-2 to establish a two-directional channel with that listener, thereby enabling that listener to not only receive but also transmit media content to the creators 310-1 ... 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
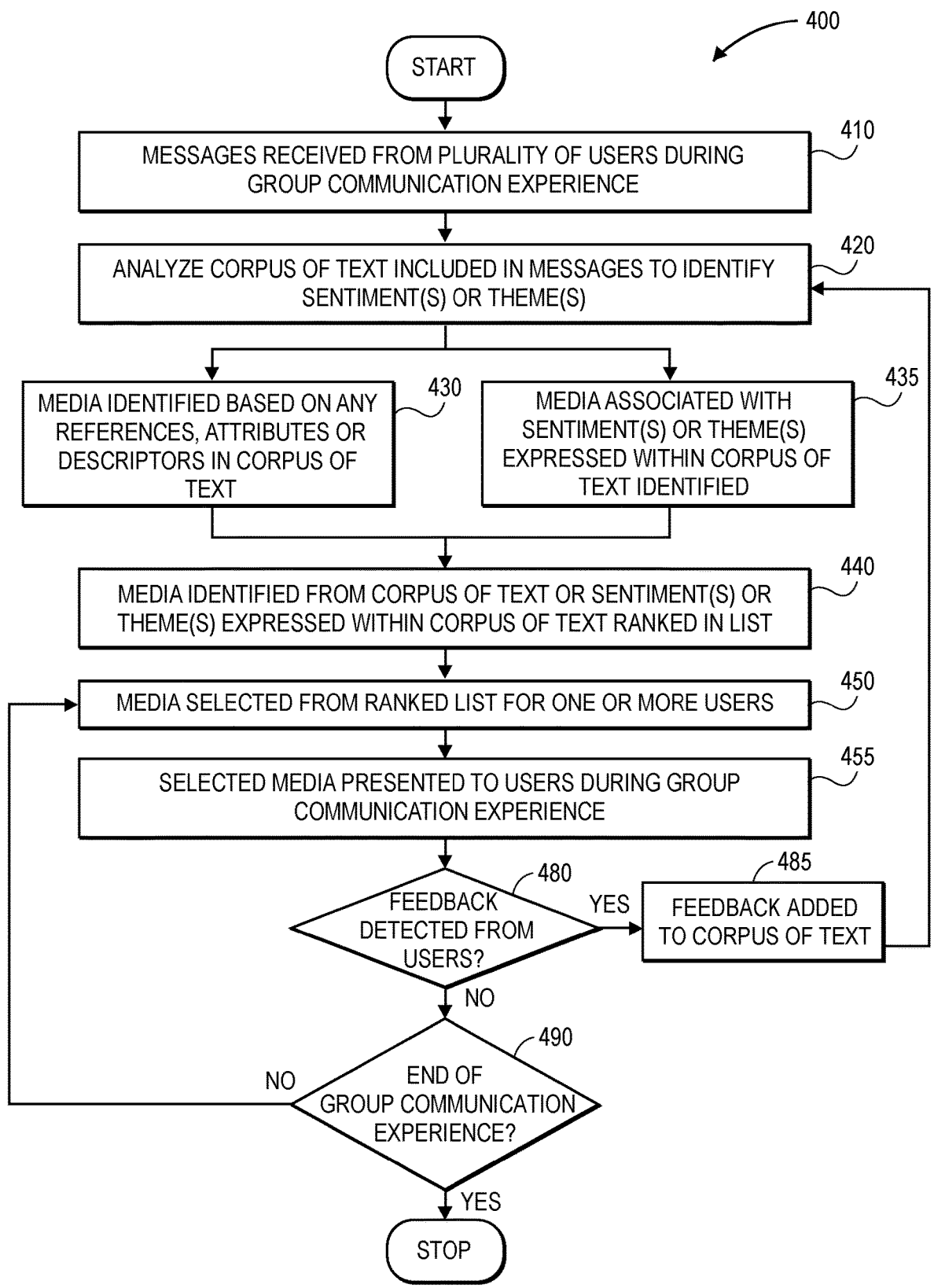
FIG. 4 is a flow chart of one process for selecting media to complement group communication experiences in accordance with embodiments of the present disclosure.

Referring to FIG. 4, a flow chart 400 of one process for selecting media to complement group communication experiences in accordance with embodiments of the present disclosure is shown. At box 410, a corpus of text is provided by a plurality of users during a group communication experience. For example, the corpus of text may include individual chat messages or other sets of text that are entered into user interfaces rendered on devices of users, e.g., by a special-purpose application dedicated to the group communication experience, a general-purpose application such as a browser, or any other application. The chat messages may be received from one or more of the plurality of users, and transmitted over one or more networks to devices associated with each of the plurality of users for display on the user interfaces rendered by such devices. The chat messages may include not only text but also one or more emoji or other characters or symbols, or any other information or data that may be received from or transmitted to users in a group chat experience, such as image files, video files, audio files, multimedia files, or any other files. Alternatively, or additionally, the chat messages may include one or more hyperlinks, such as Uniform Resource Identifiers (URI) or Uniform Resource Locators (URL) that may be accessed by selections or other interactions to retrieve additional information or data during the group communication experience.

At box 420, the corpus of text is analyzed to identify one or more sentiments of the group communication experience. For example, in some implementations, one or more portions of the corpus of text may be provided as inputs to a machine learning system as inputs, and one or more outputs received from the machine learning system in response to the inputs may be processed to determine a sentiment (or an emotion or an opinion) expressed in the corpus of text. Alternatively, the corpus of text may be compared to one or more sets of text that include text known to be associated with specific sentiments (or emotions or opinions), such as words affiliated with sentiments such as "happy" or "sad," or types of sentiments (or emotions or opinions) such as "positive," "negative," "neutral," or others.

In some implementations, sentiments, emotions or opinions may be identified for a group communication experience as a whole. In some other implementations, however, sentiments, emotions or opinions may be identified for one or more of the users participating in the group communication experience, or for each of the users participating in the group user experience, based on portions of the corpus of text including individual chat messages or other information or data received from such users.

Alternatively, or additionally, in some implementations, a corpus of text may be subject to filtering in order to remove any objectionable content from the corpus of text prior to analyzing the corpus of text to identify one or more sentiments (or emotions or opinions).

At box 430, media is identified based on any references to artists, titles, genres, eras or other attributes or descriptors within the corpus of text, and such references may be express or implied. For example, in some implementations, the corpus of text may be processed to determine whether the corpus of text includes names of any specific singers, groups, bands, concerts, albums or songs. Alternatively, the corpus of text may be processed to determine whether the corpus of text includes any lyrics, or sets of text that are similar to lyrics, e.g., mondegreens or "misheard" lyrics, or paraphrases of lyrics, and one or more songs including such lyrics may be identified. In still other implementations, the corpus of text may be processed to determine whether the corpus of text includes any references to genres, eras or other classifications of media entities, such as "'90s hip-hop," "jazz," "soul" or "classic rock." Any attributes or descriptors included within the corpus of text, or words that may otherwise be associated with media, may be used to identify media entities in accordance with the present disclosure.

In parallel, at box 435, media associated with the sentiments (or emotions or opinions) expressed within the corpus of text is identified. For example, a specific sentiment (or emotion or opinion) such as "happy" or "sad," or a type of sentiment (or emotion or opinion) such as "positive," "negative," or "neutral," is identified, and one or more media entities consistent with such sentiments or types is identified.

In some implementations, media entities may be identified based on express or implied references to artists, titles, genres, eras or other attributes or descriptors within the corpus of text, and without regard to any sentiments expressed within the corpus of text, or themes that might be identified from the corpus of text. In some other implementations, media entities may be identified based on sentiments expressed within the corpus of text, or themes that might be identified from the corpus of text, without regard to any references to artists, titles, genres, eras or other attributes or descriptors. In still other implementations, media entities may be identified based on express or implied references to artists, titles, genres, eras or other attributes or descriptors within the corpus of text, and grouped or scored based on sentiments expressed within the corpus of text, or themes that might be identified from the corpus of text.

At box 440, any media identified at box 430 or box 435 is ranked in a list. Media entities may be ranked based on any subjective factors, including but not limited to preferences or interests of the individual users of the group communication experience, such as any preferences for or interests in different artists, genres, moods, tempos, or styles, either in general or on different times of day, days of weeks, months or seasons of years as well as purchasing or listening histories of the respective users. Media entities may also be ranked based on a context of the group communication experience, or on contexts of individual chat messages or other sets of text received from the respective users.

Alternatively, or additionally, media entities may be ranked based on any objective factors, including but not limited to respective levels of popularity of the media entities (e.g., on a local, regional, national or global scale), which may be determined based on numbers of instances in which each of the individual media entities was played, downloaded, or purchased, or on any other metric. Media entities may be further ranked based on times at which references to the media entities or text from which the sentiments were identified appeared within the corpus of text or were received from the users.

In some implementations, media entities may be ranked based on a combination of any number of subjective or objective factors. Moreover, in some implementations, media may be ranked in a single list for the group communication experience as a whole. In some other implementations, media entities may be ranked for each of the respective users of the group communication experience, in individual lists.

At box 450, media is selected from the ranked list. For example, a media entity may be selected based on its location or placement in the ranked list, such that the selected media entity may be a highest-ranking entity in the ranked list, or any other entity in the ranked list. Alternatively, a media entity may be selected at random, or in accordance with a randomization policy. In some implementations, a media entity may be selected based on a time or a date at which the media entity was most recently played, downloaded, or purchased, either during the group communication experience or by any of the users at any other time.

At box 455, the selected media is caused to be played on the devices of users during the group communication experience. For example, in some implementations, where the group communication experience is hosted or managed by a control system (or a mixing system or a conference system), one or more connections may be established between the control system and a source of the selected media, e.g., a repository of media, and the media may be transmitted from the source of the selected media directly to the users during the group communication experience, e.g., by way of a conference channel to which each of the users is a subscriber, or in any other manner. The selected media may be caused to be played by one or more speakers or other sound emitters of a computer device with which a user is participating in the group communication experience, or one or more speakers or other sound emitters connected to such a computer device.

In some implementations, the same media entity (e.g., the same song, playlist, podcast or other media) may be selected from a ranked list and transmitted to devices of each of the users. In some other implementations, however, different media entities (e.g., different songs, playlists, podcasts or other media) may be selected from one or more ranked lists and transmitted to different devices of each of the respective users.

At box 480, whether any feedback regarding the selected media is received from the users is determined. For example, one or more of the users may enter chat messages or other sets of text in accordance with the group communication experience as the selected media is being played. The chat messages or other sets of text may be processed to determine whether the users like, or do not like, media entities then being played, or media entities that were previously played. For example, one or more of the users may provide positive messages such as "I like this," "my favorite song," or other affirmative statements, as well as negative messages such as "not this again," "this song stinks," or other adverse statements. Alternatively, the users of the group communication experience may provide feedback regarding selected media in any other manner.

At box 485, any of the feedback received is added to the corpus of text, and the process returns to box 420, where the updated corpus of text is analyzed to identify one or more sentiments of the group communication experience.

If no feedback is received from any of the users, then the process advances to box 490, where whether the group communication experience has ended is determined. If the group communication experience has not ended, then the process returns to box 450, where additional media is selected from the ranked list and caused to be played on the devices of the users during the group communication experience.

As is discussed above, contents of text exchanges between users of a group communication experience may be processed to identify references to any artists, titles, genres or other attributes or descriptors within the corpus of text, or to identify sentiments (or emotions or opinions) of the group communication experience, or of any of the users. Media entities may be identified and selected for the group communication experience, or for any of the users, based on the references or sentiments identified therein. Referring to FIGS. 5A through 5D, views of aspects of one system for presenting chat messages to listeners in accordance with embodiments of the present disclosure are shown. Except where otherwise noted, reference numerals preceded by the number "5" shown in FIGS. 5A through 5D indicate components or features that are similar to components or features having reference numerals preceded by the number "3" shown in FIG. 3, by the number "2" shown in FIG. 2A or 2B or by the number "1" shown in FIGS. 1A through 1K.

As is shown in FIG. 5A, a system 500 includes a control system 550 connected to a plurality of devices 582-1, 582-2 . . . 582-n or other systems that are connected to one another over one or more networks 590, which may include the Internet in whole or in part. Each of the devices 582-1, 582-2 . . . 582-n may be associated with any number n of users (or listeners) who are participants in a group chat experience (or group communication experience). The device 582-1 is a smart speaker, while the device 582-2 is a television monitor and keyboard, and the device 582-n is a desktop computer. However, the computer systems or devices that may be operated or utilized by participants in the group chat experience in accordance with the present disclosure are not limited to any of the devices or systems shown in FIG. 5A.

Figure 5B:
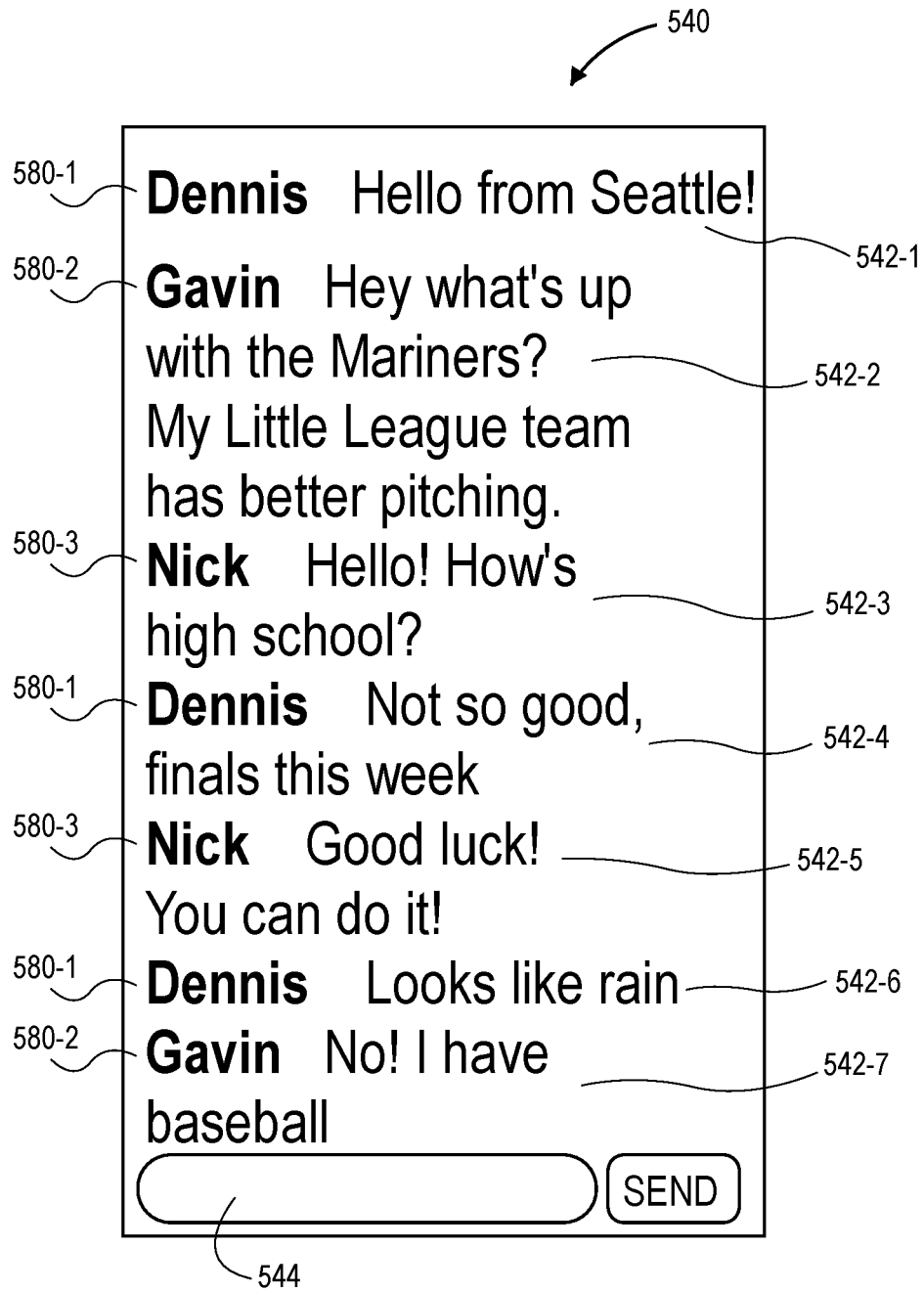

As is shown in FIG. 5B, a window 540 (e.g., a chat window, or a user interface) including a plurality of chat messages 542-1, 542-2, 542-3, 542-4, 542-5, 542-6, 542-7 that may be generated by one or more users 580-1, 580-2, 580-3 participating in the group communication experience, e.g., by entering text into one or more user interfaces, and transmitted to devices used by all of such users who are participating in the group communication experience. The window 540 is representative of a chat window that may be displayed by a device or system such as a smartphone, a tablet computer, a wristwatch, a laptop computer, a desktop computer, a smart speaker, a television, an automobile, a media player, or any other type or form of device or system having one or more processors, memory or storage components. The window 540 may be sized, shaped or proportioned to appear within a selected or designated portion of a display, in any other location, and is not drawn to scale. The window 540 also includes a text box 544 into which chat messages may be entered by a user participating in the group communication experience, and may optionally include any additional features for displaying, receiving or transmitting text.

As is also shown in FIG. 5B, a chat message 542-1 provided by a user 580-1 named Dennis reads, "Hello from Seattle!" A chat message 542-2 provided by a user 580-2 named Gavin in reply to the chat message 542-1 reads, "Hey what's up with the Mariners? My Little League team has better pitching." A chat message 542-3 provided by a user 580-3 named Nicholas, also in reply to the chat message 542-1, also reads, "Hello! How's high school?"

As is further shown in FIG. 5B, a chat message 542-4 provided by the user 580-1 in reply to the chat message 542-3 reads, "Not so good, finals this week," and a chat message 542-5 provided by the user 580-3 in reply to the chat message 542-4 reads, "Good luck! You can do it!" Another chat message 542-6 provided by the user 580-1 reads, "Looks like rain," and a chat message 542-7 provided by the user 580-2 in reply to the chat message 542-6 reads, "No! I have baseball!"

Figure 5C:
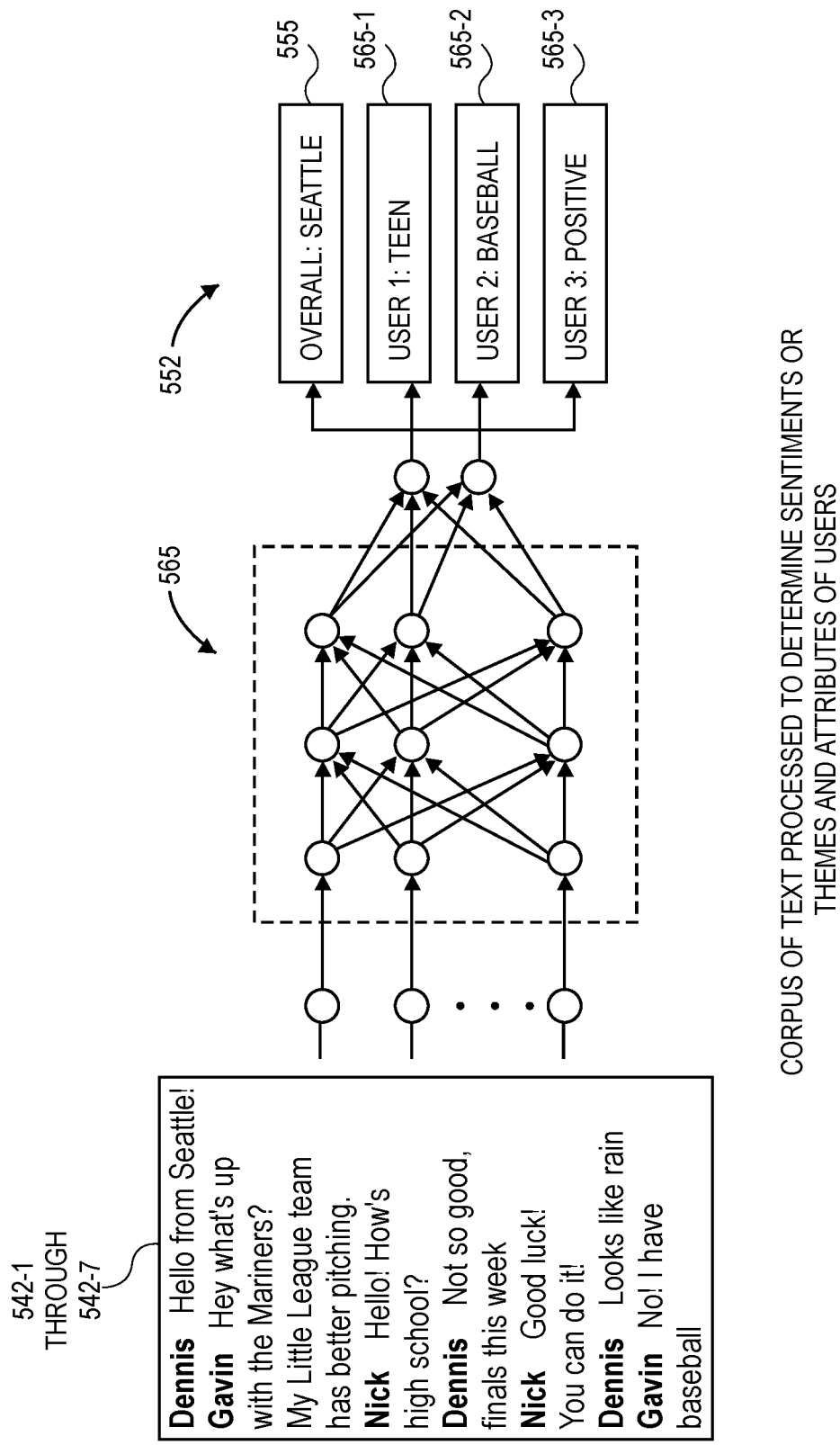

As is discussed above, a corpus of text associated with a group communication experience may be processed to identify media entities, either based on express references to the media entities included in the corpus, or based on any sentiments of the group communication experience or any of the users expressed within the corpus of text. As is shown in FIG. 5C, the chat messages 542-1 through 542-7 received from the users 580-1, 580-2, 580-3 as shown in FIG. 5B are provided as inputs to a machine learning system 565, which may be operated by the control system 550 or any other device or system hosting the group communication experience, and trained to identify one or more relevant sets of text sentiments (or emotions or opinions) included within the chat messages 542-1 through 542-7, or any relevant keywords, themes or other aspects of the chat messages 542-1 through 542-7. As is further shown in FIG. 5C, one or more outputs 552 received from the machine learning system 565 may include an overall theme 555 of the group communication experience, viz., Seattle, along with descriptors 565-1, 565-2, 565-3 of each of the users 580-1, 580-2, 580-3, viz., that the user 580-1 is a teen 565-1, that the user 580-2 prefers baseball 565-2, and that the user 580-3 is generally positive 565-3 in nature. For example, the theme 555 may be determined based on the express reference to Seattle or its professional baseball team in the chat messages 542-1, 542-2, including an identifier of Seattle as a location of the user 580-1. The descriptor 565-1 of the user 580-1 may be determined by an acknowledgment in the chat message 542-4 that the user 580-1 is in high school and currently taking final examinations. The descriptor 565-2 of the user 580-2 may be determined based on the references to baseball in each of the chat messages 542-2, 542-7 received from the user 580-2. The descriptor 565-3 of the user 580-3 may be determined from the positive sentiments expressed in the chat messages 542-3, 542-5.

Figure 5D:
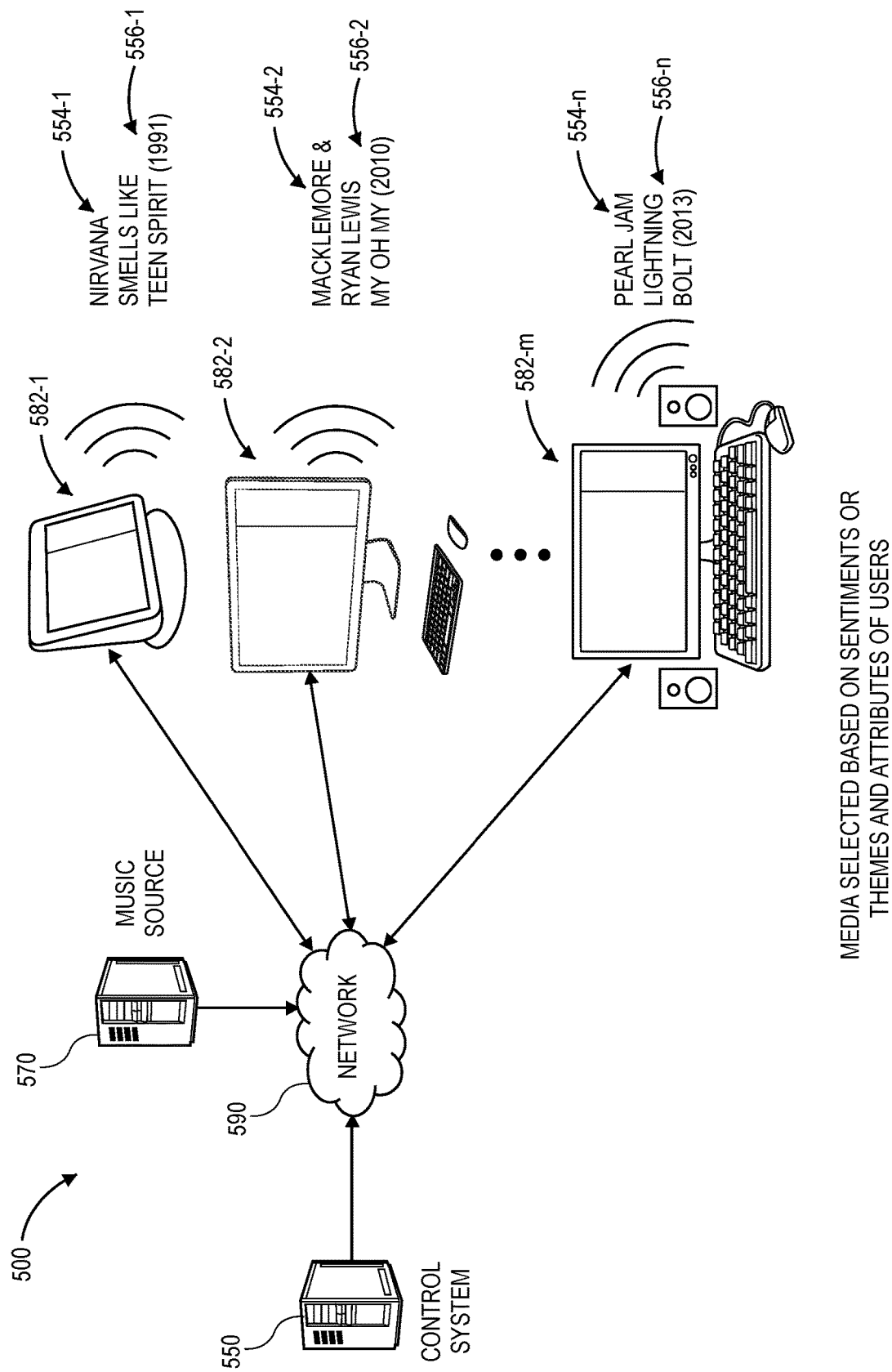

Information identified from chat messages or other text of a group communication experience may be used to identify a single media entity to be played by all of the devices of users during the group communication experience, e.g., a single song, playlist, podcast or other media, or individual media entities to be played by individual devices of individual users during the media experience. As is shown in FIG. 5D, a media title 556-1, viz., the 1991 song "Smells Like Teen Spirit," by an artist or group 554-1, viz., Nirvana, is identified for the user 580-1 based on the theme 555 and the descriptor 565-1 and transmitted from a music source 570 to the device 582-1 over one or more networks 590. In particular, the artist or group 554-1 was from Seattle, consistent with the theme 555, and the media title 556-1 expressly references the descriptor 565-1 of the user 580-1. The media title 556-1 may be played by one or more speakers or other sound emitters associated with the device 582-1 during the group communication experience.

As is also shown in FIG. 5D, a media title 556-2, viz., the 2010 song "My Oh My," by an artist or group 554-2, viz., Macklemore & Ryan Lewis, is identified for the user 580-2 based on the theme 555 and the descriptor 565-2, and transmitted from the music source 570 to the device 582-2 over the one or more networks 590. In particular, the artist or group 554-2 is also from Seattle, consistent with the theme 555, and the media title 556-2 is based on a championship baseball game played in Seattle in 1995, consistent with both the theme 555 and the descriptor 565-2 of the user 580-2. The media title 556-2 may be played by one or more speakers or other sound emitters associated with the device 582-2 during the group communication experience.

As is further shown in FIG. 5D, a media title 556-3, viz., the 2013 song "Lightning Bolt," by an artist or group 554-3, viz., Pearl Jam, is identified for the user 580-3 based on the theme 555 and the descriptor 565-3, and transmitted from the music source 570 to the device 582-3 over the one or more networks 590. In particular, the artist or group 554-3 is also from Seattle, consistent with the theme 555, and the media title 556-3 is an energetic, positive song, consistent with both the descriptor 565-3 of the user 580-3. The media title 556-3 may be played by one or more speakers or other sound emitters associated with the device 582-3 during the group communication experience.

Figure 6:
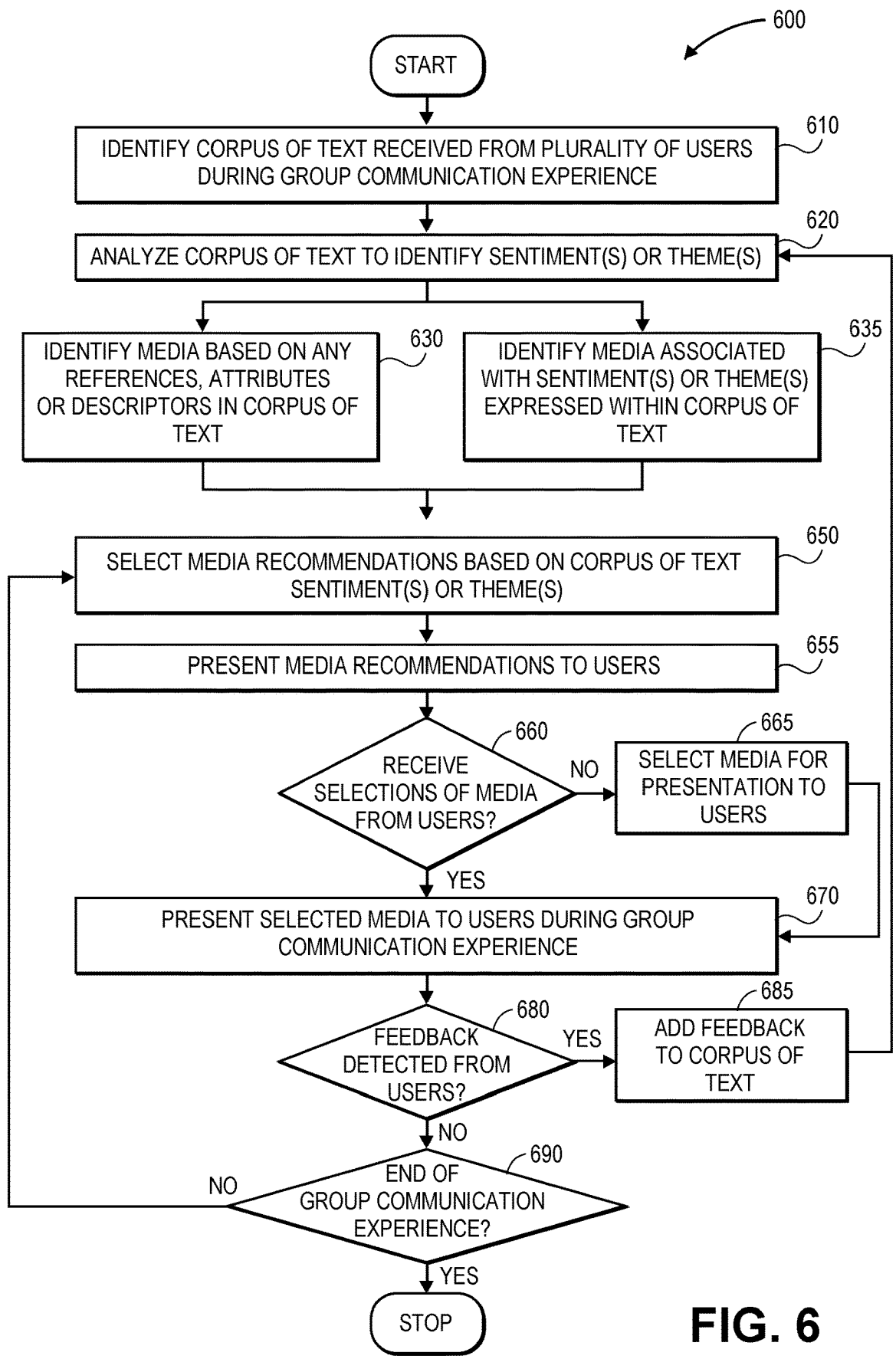
FIG. 6 is a flow chart of one process for selecting media to complement group communication experiences in accordance with embodiments of the present disclosure.

Referring to FIG. 6, a flow chart 600 of one process for selecting media to complement group communication experiences in accordance with embodiments of the present disclosure is shown. At box 610, a corpus of text is provided by a plurality of users during a group communication experience, e.g., in one or more chat messages or sets of text received from one or more of the users and transmitted to all of the users. At box 620, the corpus of text is analyzed to identify one or more sentiments of the group communication experience. As is discussed above, one or more portions of the corpus of text may be provided as an input to a machine learning system, and a sentiment (or an emotion or an opinion) of the group communication experience as a whole, or of one or more users participating in the group communication experience in particular, may be identified based on outputs received in response to the inputs. Alternatively, or additionally, the corpus of text may be compared to one or more sets of text that are known to be associated with specific sentiments or types of sentiments, and one or more sentiments, emotions or opinions may be identified as a result of the comparison.

At box 630, media is identified based on any references to artists, titles, genres or other attributes or descriptors within the corpus of text, and in parallel, at box 635, media associated with the sentiments (or emotions or opinions) expressed within the corpus of text is also identified.

At box 650, one or more recommendations of media are selected based on the corpus of text identified at box 610 or the sentiments identified based on the corpus of text at box 620. For example, recommendations of media entities may be identified based on any subjective factors, e.g., preferences or interests of the individual users of the group communication experience, in different artists, genres, moods, tempos, or styles, either in general or on different times of day, days of weeks, months or seasons of years. Recommendations of media entities may also be identified based on any purchasing or listening histories of the respective users. Recommendations of media entities may be further identified based on a context of the group communication experience, or on contexts of individual chat messages or other sets of text received from the respective users.

Recommendations of media entities may also be identified based on any objective factors, e.g., respective levels of popularity of the media entities, which may be determined based on numbers of instances in which each of the individual media entities was played, downloaded, or purchased, or on any other metric. Recommendations of media entities may also be further ranked based on times at which references to the media entities or text from which the sentiments were identified appeared within the corpus of text or were received from the users.

In some implementations, recommendations of media entities may be identified based on a combination of any number of subjective or objective factors. Moreover, in some implementations, a single set of recommendations of media entities may be identified based on a group communication experience as a whole. In some other implementations, however, respective sets of recommendations of media entities may be identified for each of the respective users of the group communication experience.

At box 655, the media recommendations are presented to the users, e.g., in an interactive or selectable manner, in one or more user interfaces rendered by devices of the users of the group communication experience. For example, an application associated with the group communication experience may display recommendations of media entities in one or more user interfaces each having any number of buttons, text boxes, checkboxes, drop-down menus, list boxes, toggles, pickers, search fields, tags, sliders, icons, carousels, or any other interactive or selectable elements or features that permit a user to select one or more of the recommendations.

At box 660, whether one of the media recommendations is selected by a user is determined. If a user declines to select one of the media recommendations, the process advances to box 665, where media is selected for presentation to such users, e.g., automatically, from one or more of the media recommendations presented to the user or from any other set of media.

After the user has selected a media recommendation at box 660, or after media has been selected for the user at box 665, the process advances to box 670, where the selected media is presented to the users during the group communication experience, such as in any of the manners referenced above, e.g., by one or more speakers of a computer device with which each of the users is participating in the group communication experience, or in any other manner.

At box 680, whether any feedback regarding the selected media is received from the users is determined. The feedback may be included in chat messages or other sets of text provided in accordance with the group communication experience as a selected media entity is being played, or in any other manner, including positive messages such as "I like this," "my favorite song," or other affirmative statements, negative messages such as "not this again," "this song stinks," or other adverse statements, or in any other manner.

At box 685, any of the feedback received is added to the corpus of text, and the process returns to box 620, where the updated corpus of text is analyzed to identify one or more sentiments of the group communication experience.

Figure 7A:
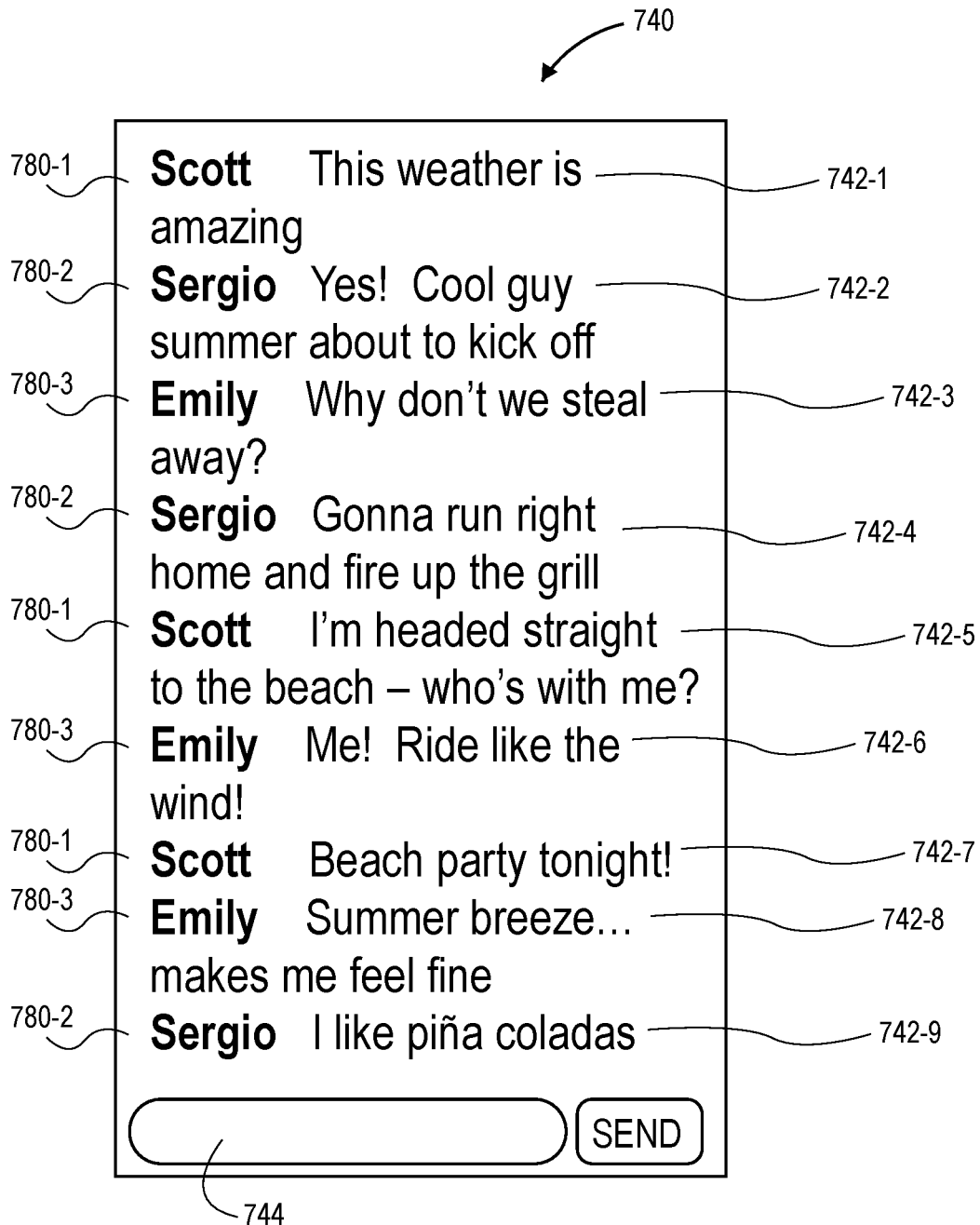
FIGS. 7A through 7C are views of aspects of one system for selecting media to complement group communication experiences in accordance with embodiments of the present disclosure.
Figure 7B:
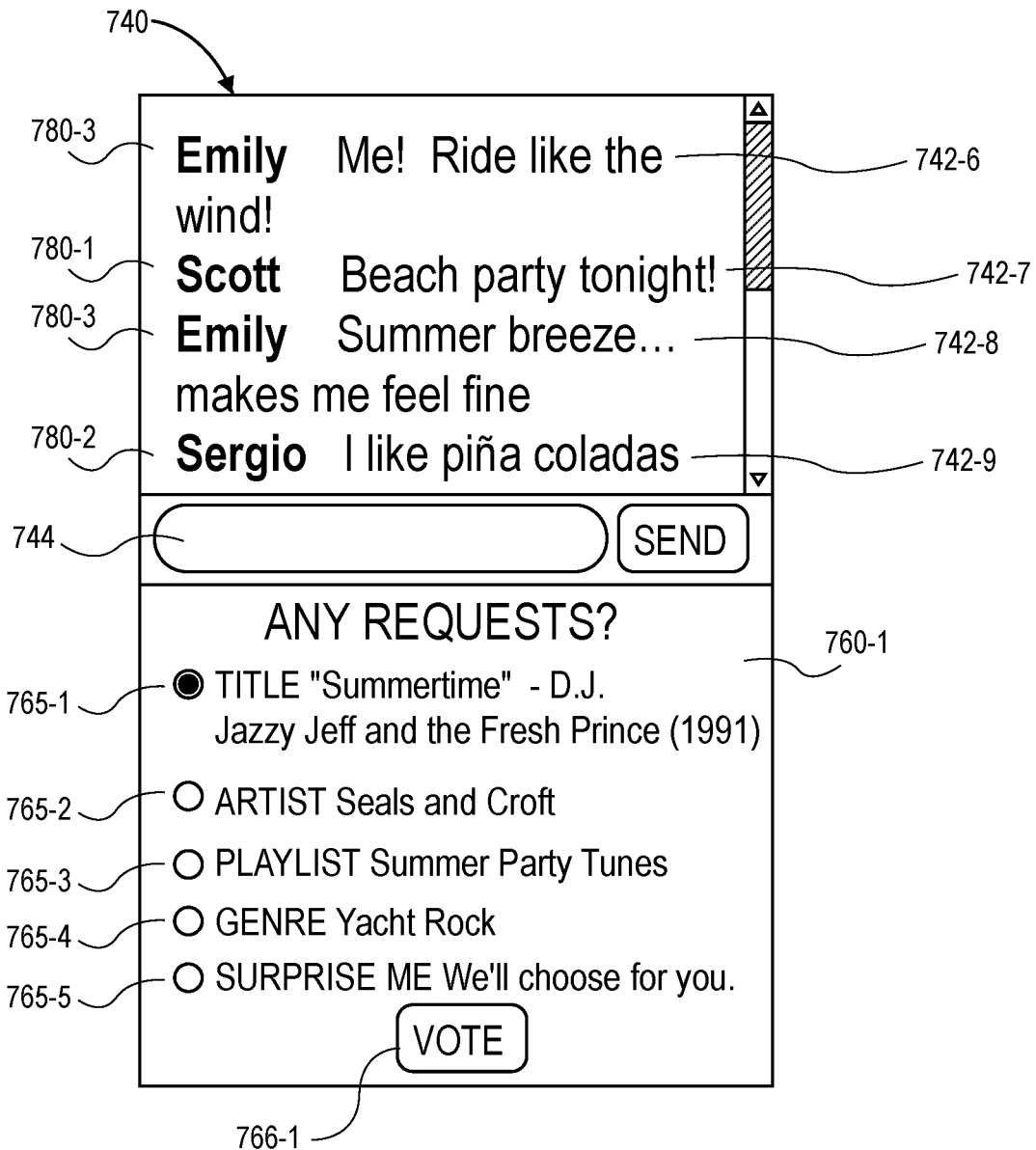
Figure 7C:
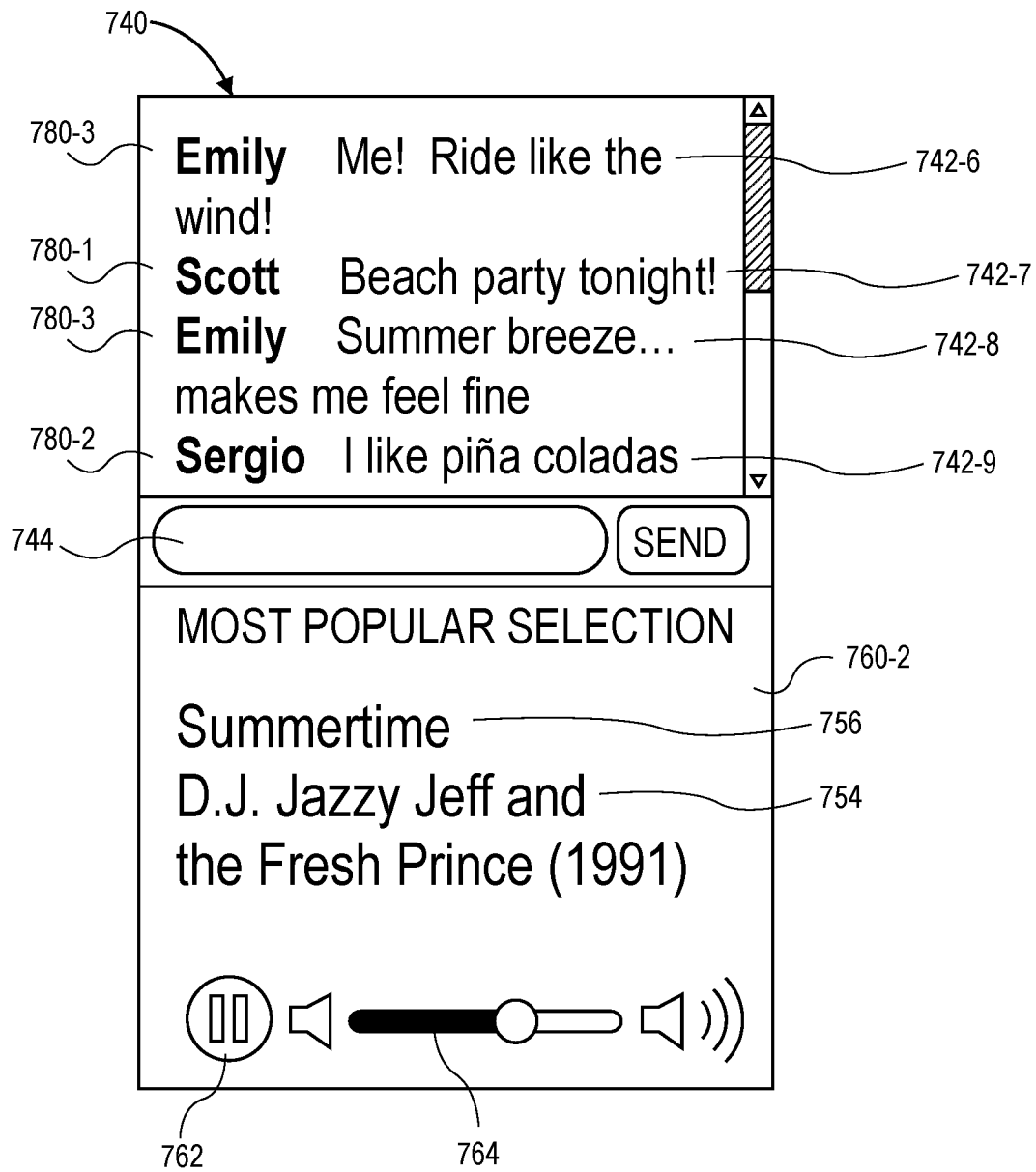

If no feedback is received from any of the users, then the process advances to box 690, where whether the group communication experience has ended is determined. If the group communication experience has not ended, then the process returns to box 650, where additional media recommendations are selected for the users based on the corpus of text or the sentiments expressed therein, and to box 655, where the additional media recommendations are presented to the users.

Where media content is identified for users of a group communication experience, one or more media entities may begin playing from devices operated by such users immediately. Alternatively, users may be permitted to choose one or more media entities to be played from such devices, e.g., by one or more gestures or other interactions with user interfaces that may be associated with the playing of media content. Referring to FIGS. 7A through 7C, views of aspects of one system for presenting chat messages to listeners in accordance with embodiments of the present disclosure are shown. Except where otherwise noted, reference numerals preceded by the number "7" shown in FIGS. 7A through 7C indicate components or features that are similar to components or features having reference numerals preceded by the number "5" shown in FIGS. 5A through 5D, by the number "3" shown in FIG. 3, by the number "2" shown in FIG. 2A or 2B or by the number "1" shown in FIGS. 1A through 1K.

As is shown in FIG. 7A, a window 740 (e.g., a chat window, or user interface) including a plurality of chat messages 742-1, 742-2, 742-3, 742-4, 742-5, 742-6, 742-7, 742-8, 742-9 that may be generated by one or more users 780-1, 780-2, 780-3 participating in a group communication experience, e.g., by entering text into one or more user interfaces, and transmitted to devices used by all of such users who are participating in the group communication experience. The window 740 is representative of a chat window that may be displayed by a device or system such as a smartphone, a tablet computer, a wristwatch, a laptop computer, a desktop computer, a smart speaker, a television, an automobile, a media player, or any other type or form of device or system having one or more processors, memory or storage components. The window 740 may be sized, shaped or proportioned to appear within a selected or designated portion of a display, in any other location, and is not drawn to scale. The window 740 also includes a text box 744 into which chat messages may be entered by a user participating in the group communication experience, and may optionally include any additional features for displaying, receiving or transmitting text.

As is also shown in FIG. 7A, a chat message 742-1 provided by a user 780-1 named Scott reads, "This weather is amazing." A chat message 742-2 provided by a user 780-2 named Sergio reads, "Yes! Cool guy summer about to kick off." A chat message 742-3 provided by a user 780-3 named Emily reads, "Why don't we steal away?"

As is further shown in FIG. 7A, a chat message 742-4 provided by the user 780-2 reads, "Gonna run right home and fire up the grill," and a chat message 742-5 provided by the user 780-1 reads, "I'm headed straight to the beach—who's with me?" A chat message 742-6 provided by the user 780-3 in reply to the chat message 742-5 reads, "Me! Ride like the wind!" and is followed by a chat message 742-7 provide by the user 780-1 in reply to the chat message 742-6, which reads, "Beach party tonight!" A chat message 742-8 provided by the user 780-3 reads, "Summer breeze . . . makes me feel fine," while a chat message 742-9 provided by the user 780-2 reads, "I like piña coladas."

As is discussed above, where media entities are identified based on a corpus of text associated with a group communication experience, the media entities may be described in one or more user interfaces that may be presented to users, and the users may execute one or more gestures or other interactions with the user interfaces to select one or more media entities to be played during the group communication experience, e.g., a single song, playlist, podcast or other media content to be played by all of the devices of users during the group communication experience, or individual media entities to be played by individual devices of individual users during the group communication experience. As is shown in FIG. 7B, a window 760-1 (e.g., a media selection window, or user interface) is displayed in association with the window 740. The window 760-1 includes a plurality of selectable features 765-1, 765-2, 765-3, 765-4, 765-5 (e.g., radio buttons), each of which is associated with a specific media entity, or a specific option for playing media. For example, the selectable feature 765-1 is associated with a 1991 song entitled "Summertime," by D. J. Jazzy Jeff and the Fresh Prince, which may have been identified as a recommendation for one or more users of the group communication experience based on a similarity between a title or lyrics of the song and a theme, e.g., summer, of many of the chat messages 742-1, 742-2, 742-3, 742-4, 742-5, 742-6, 742-7, 742-8, 742-9. The selectable feature 765-2 is associated with media by an artist, viz., Seals and Croft, which may have been identified as a recommendation for one or more users of the group communication experience based on lyrics of a 1972 song entitled "Summer Breeze" by that artist, which contains text included in the chat message 742-8.

The selectable feature 765-3 is associated with a playlist entitled "Summer Party Tunes," which may have been identified as a recommendation for one or more users of the group communication experience based on a similarity of its theme, e.g., summer, to many of the chat messages 742-1, 742-2, 742-3, 742-4, 742-5, 742-6, 742-7, 742-8, 742-9. The selectable feature 765-4 is associated with the music genre Yacht Rock, which generally includes soft rock songs dating from the 1970s and 1980s. The genre may have been identified as a recommendation for one or more users of the group communication experience based on lyrics of songs of that genre, including the 1980 song "Steal Away" by Robbie Dupree, the 1980 song "Ride Like the Wind" by Christopher Cross, and the 1979 song "Escape (The Pina Colada Song)" by Rupert Holmes, as well as "Summer Breeze," which contain text of the chat messages 742-3, 742-6, 742-8, 742-9. Finally, the selectable feature 765-5 is associated with a setting by which media entities will be selected at random, e.g., by a control system, a mixing system, a broadcast system or a conference system associated with the group chat experience, or based on any information or data that may be known regarding the users participating in the group communication experience.

As is shown in FIG. 7C, upon the selection of the selectable feature 765-1, a window 760-2 (e.g., a media controls window, or user interface) appears in place of the window 760-1, and includes an identifier of the artist or group 754 and the media title 756, as well as a selectable element or feature 762 for playing or pausing the playing of the media title 756, as well as a slider 764 or another adjustable feature for setting or modifying a level of volume of the media title 756.

The systems and methods of the present disclosure may also be utilized to identify media entities based on spoken words, and are not limited to text-based group communication experiences conducted via computers. For example, one or more microphones or other acoustic sensors may be used to capture acoustic signals, and the acoustic signals may be interpreted to identify any words spoken by one or more persons represented therein. The spoken words may be processed to identify any media entities associated therewith, based on any references, attributes or descriptors of media entities included in such words, any sentiments expressed in such words, or any themes associated with such words, and the media entities may be presented to the persons by one or more speakers or other acoustic emitters.

Referring to FIGS. 8A through 8E, views of aspects of one system for selecting media to complement group communication experiences in accordance with embodiments of the present disclosure. Except where otherwise noted, reference numerals preceded by the number "8" shown in FIGS. 8A through 8E indicate components or features that are similar to components or features having reference numerals preceded by the number "7" shown in FIGS. 7A through 7C, by the number "5" shown in FIGS. 5A through 5D, by the number "3" shown in FIG. 3, by the number "2" shown in FIG. 2A or 2B or by the number "1" shown in FIGS. 1A through 1K.

Figure 8A:
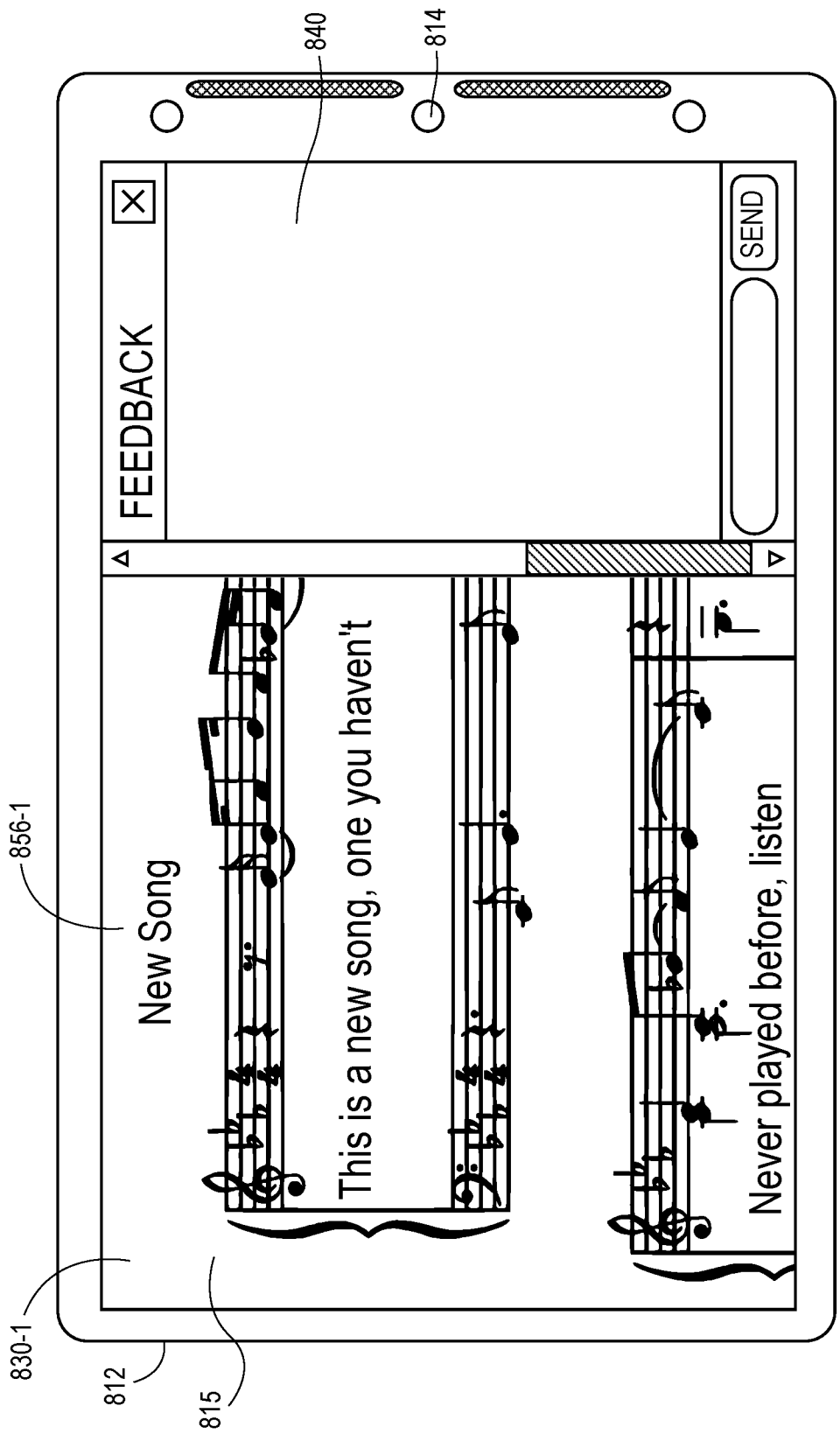

As is shown in FIG. 8A, a computer device 812 (e.g., a tablet computer or other mobile device) includes a display 815 and a plurality of microphones 814 or other acoustic sensors. A user interface 830-1 is rendered on the display 815 and includes a visual representation of sheet music for a song 856-1, viz., "New Song," with notes and lyrics provided with treble and bass clefs along staffs in parallel. Additionally, the display 815 further includes a window 840 (e.g., a chat window or user interface) that may also be sized, shaped or proportioned to appear within a selected or designated portion of the display 815, e.g., along a right edge of the display 815, or in any other location. The window 840 may be rendered by the computer device 812 in any manner, e.g., by executing code retrieved from one or more memory components provided on the computer device 812, or transmitted to the computer device 812 by an external system or from any other source. The window 840 may display transcribed versions of spoken utterances received from one or more users provided within a vicinity of the computer device 812 or in any other location, e.g., by the microphones 814 or by any other acoustic sensors (not shown in FIG. 8A). Alternatively, the computer device 812 may be a laptop computer, a desktop computer or any other device or system.

Figure 8B:
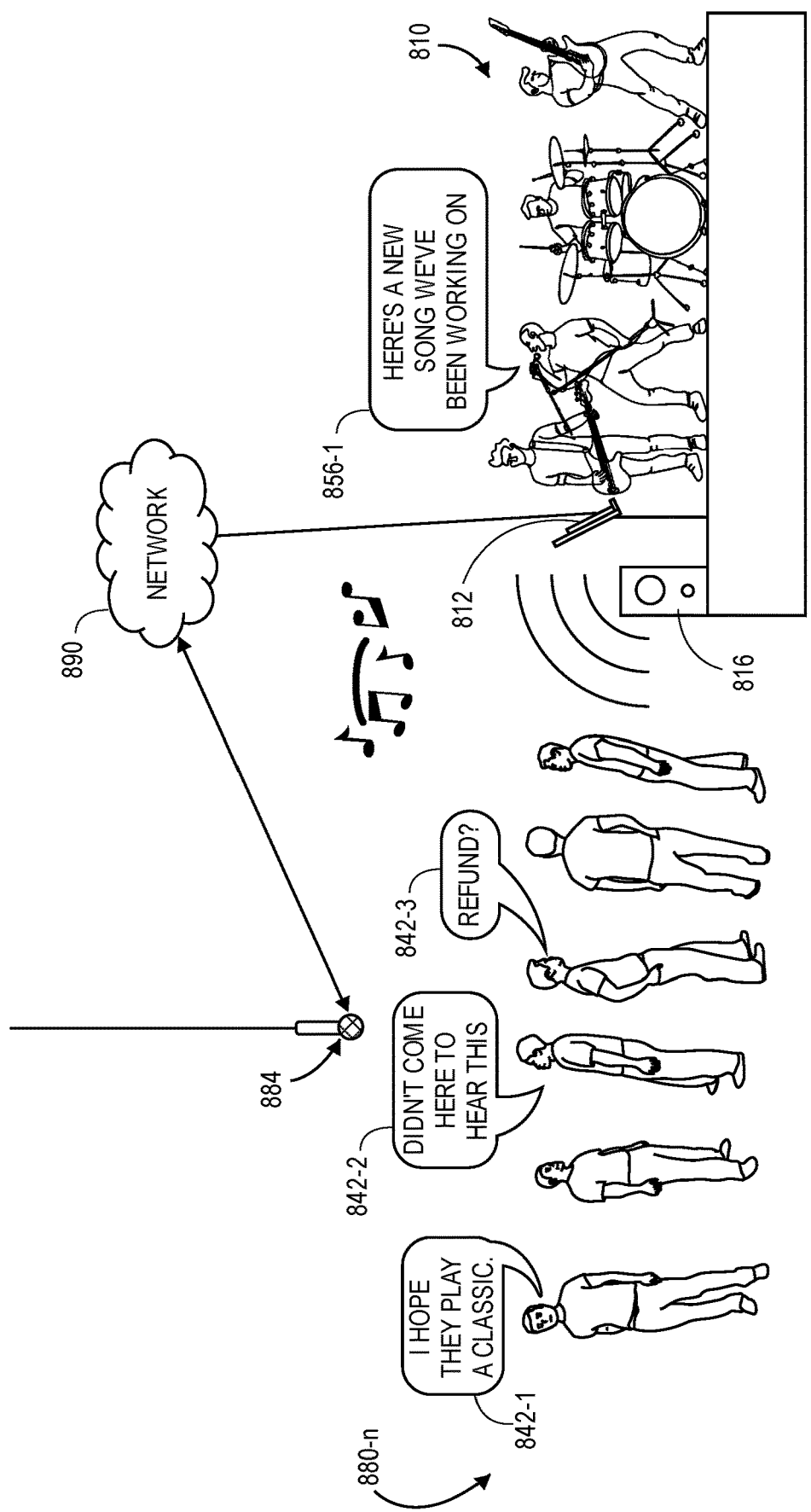

As is shown in FIG. 8B, an artist or group 810 prepares to play music to a crowd of users (or listeners) 880-n. The computer device 812 is provided on an easel, a stand or another structure or system for viewing by one or more members of the artist or group 810, and a speaker 816 or another acoustic emitter is configured to project sounds (e.g., music and/or spoken words) toward the users 880-n. Additionally, one or more microphones 884 are provided within an acoustic range of one or more of the users 880-n and configured to capture acoustic signals, including but not limited to spoken words, associated with the users 880-n. The computer device 812 is in communication with the microphones 884 over one or more networks 890, which may include the Internet in whole or in part. The speaker 816 may be coupled to the computer device 812 or any other system from which acoustic signals may be received, including but not limited to a source of media content or one or more microphones, and may be configured to amplify or otherwise process the acoustic signals and play the acoustic signals within a vicinity of the users 880-n.

As is further shown in FIG. 8B, one or more members of the artist or group 810 utters words including a reference to the song 856-1, stating "here's a New Song we've been working on." In response, one or more of the users 880-n utter words regarding the artist or group 810 and/or the song 856-1, including a message 842-1 of "I hope they play a classic," a message 842-2 of "didn't come here to hear this," and a message of 842-3 of "refund?" that are captured by the one or more microphones 884 in communication with the computer device 812.

Figure 8C:
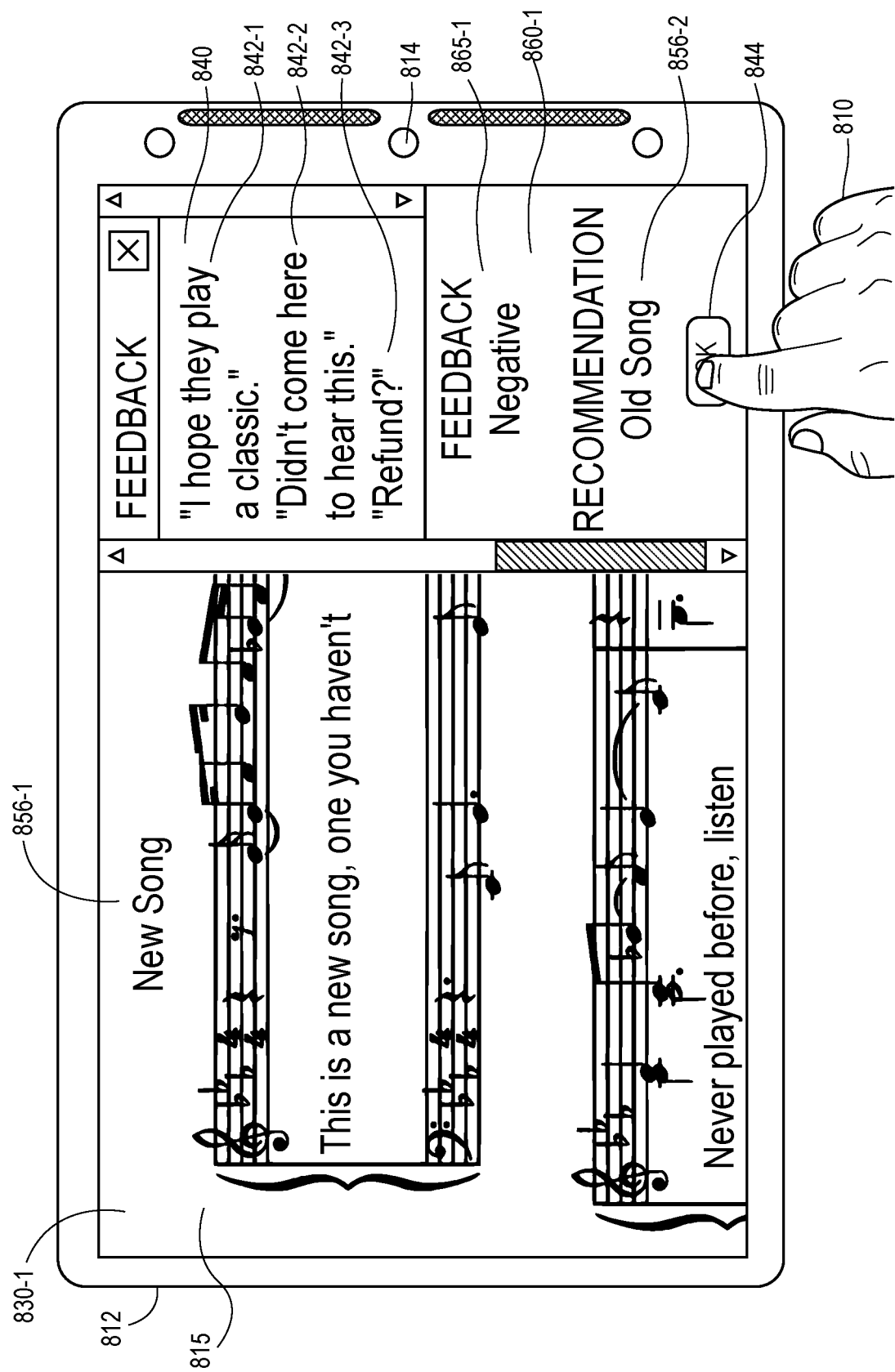

In accordance with implementations of the present disclosure, words spoken by the users 880-n, e.g., one or more of the messages 842-1, 842-2, 842-3, may be transcribed and processed to determine whether such words include any references to or attributes or descriptors of media entities within such words, to identify sentiments (or emotions or opinions) expressed within such words, or to determine a theme from such words, and to recommend any media entities based on such references, attributes, descriptors, sentiments or themes. As is shown in FIG. 8C, text of the messages 842-1, 842-2, 842-3 is displayed within the window 840 on the display 815.

Additionally, a window 860-1 (e.g., a recommendation window or user interface) is shown on the display 815, e.g., beneath the window 840, and includes a summary 865-1 (or characterization) of the messages 842-1, 842-2, 842-3 and a recommendation of a song 856-2, viz., "Old Song," identified based on the messages 842-1, 842-2, 842-3. For example, because the message 842-1 represents a request by one or more of the users 880-n for an older song, the message 842-2 includes a statement that one or more of the users 880-n does not want to hear the song 856-1, and the message 842-3 implies that one or more of the users 880-n may request a refund or other compensation after learning that the artist or group 810 intends to play the song 856-1, the computer device 812 (or any other device or system, not shown in FIG. 8C) may characterize the messages 842-1, 842-2, 842-3 as negative in nature and display the summary 856-1 accordingly. Additionally, the computer device 812 (or any other device or system, not shown in FIG. 8C) may further identify one or more media entities (e.g., songs, such as the song 856-2) that are consistent with the messages 842-1, 842-2, 842-3, or more closely aligned with any references, attributes, descriptors, sentiments or themes of the messages 842-1, 842-2, 842-3 than the song 856-1 is. The window 860-1 further includes a selectable feature 844 for accepting the recommendation of the song 856-2, which may cause information or data regarding the song 856-2, e.g., sheet music and/or lyrics, to be displayed on the computer device 812.

Figure 8D:
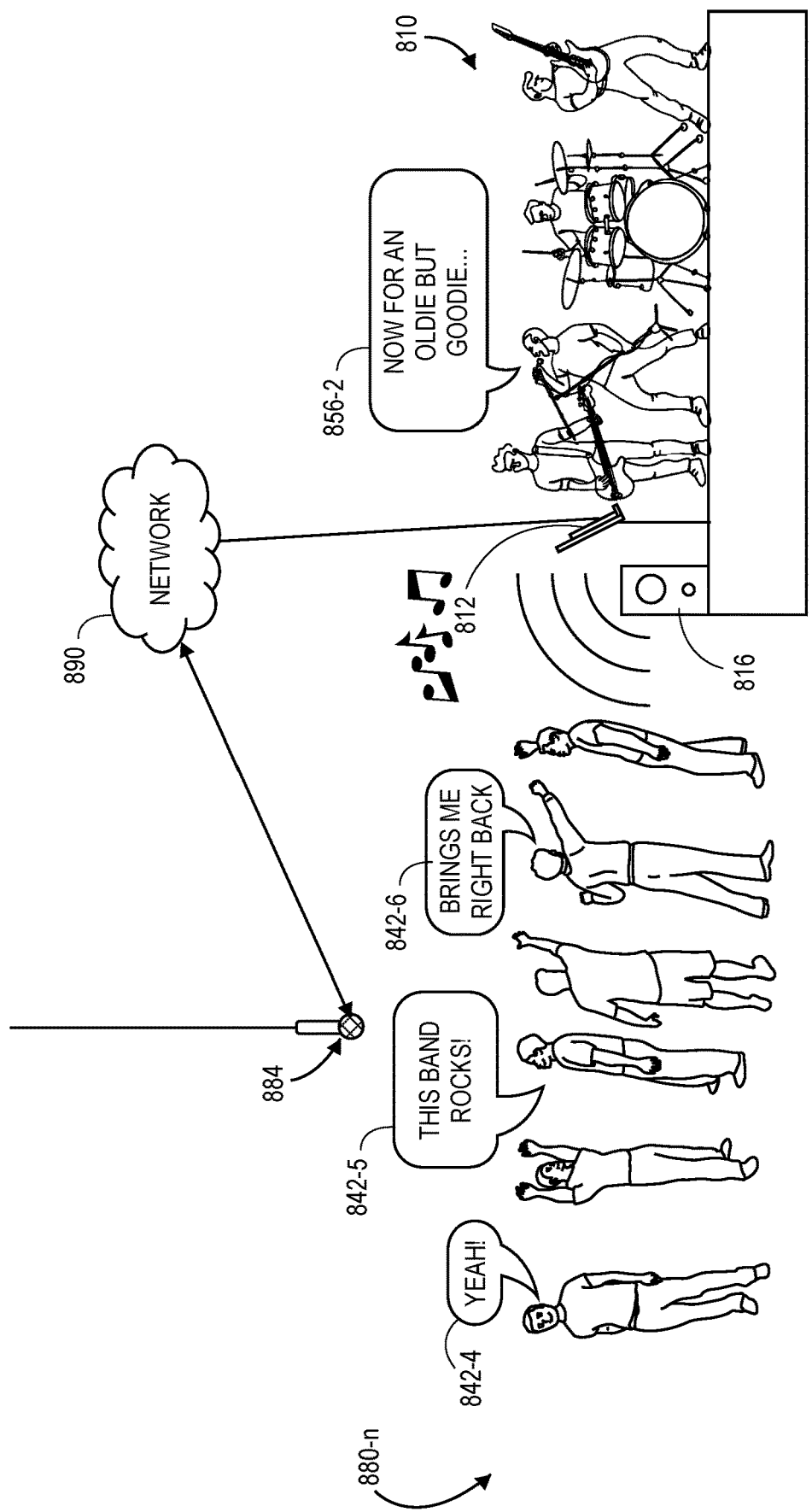

As is shown in FIG. 8D, one or more members of the artist or group 810 utters words including a reference to the song 856-2, stating "now for an oldie but goodie." In response, one or more of the users 880-n utter words regarding the artist or group 810 and/or the song 856-2, including a message 842-4 of "Yeah!," a message 842-5 of "this band rocks!" and a message of 842-6 of "brings me right back" that are captured by the one or more microphones 884 in communication with the computer device 812.

As is shown in FIG. 8E, a user interface 830-2 is rendered on the display 815 and includes a visual representation of sheet music for the song 856-2, viz., "Old Song," with notes and lyrics provided with treble and bass clefs along staffs in parallel. Additionally, the window 840 further includes words spoken by the users 880-n, e.g., one or more of the messages 842-4, 842-5, 842-6, which may be transcribed and processed to determine whether such words include any references to or attributes or descriptors of media entities within such words, to identify sentiments (or emotions or opinions) expressed within such words, or to determine a theme from such words, and to recommend any media entities based on such references, attributes, descriptors, sentiments or themes. As is also shown in FIG. 8E, a window 860-2 (e.g., a recommendation window or user interface) is shown on the display 815, e.g., beneath the window 840, and includes a summary 865-2 (or characterization) of the messages 842-4, 842-5, 842-6 as positive in nature, and includes a visible indicator of the summary 865-2. For example, because the messages 842-4, 842-5, 842-6 imply contentment or satisfaction with the reference to the song 856-2 by the artist or group 810, the computer device 812 visibly indicates this contentment or satisfaction to the artist or group 810, which may then play the song 856-2 to the users 880-n with confidence that the song 856-2 will be favorably received.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 4 or 6, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a first computer system having at least a first data store and at least a first computer processor, wherein the first computer system is associated with a first participant in a group communication experience, and wherein the first computer system is connected to one or more networks;
    a second computer system having at least a second data store and at least a second computer processor, wherein the second computer system is associated with a second participant in the group communication experience, and wherein the second computer system is connected to the one or more networks; and
    a third computer system having at least a third data store and at least a third computer processor, wherein the third computer system hosts the group communication experience, and
    wherein the third data store has one or more sets of instructions stored thereon that, when executed by at least the third computer processor, cause the third computer system to perform a method comprising:
    receiving at least a first message from the first computer system over the one or more networks during the group communication experience, wherein the first message comprises a first set of text entered by a first participant in the group communication experience into a first chat window provided on a first display of the first computer system, and wherein the first chat window is rendered by an application associated with the group communication experience executed by the first computer system;
    receiving at least a second message from the second computer system over the one or more networks during the group communication experience, wherein the second message comprises a second set of text entered by a second participant in the group communication experience into a second chat window provided on a second display of the second computer system, and wherein the second chat window is rendered by the application associated with the group communication experience executed by the second computer system;
    transmitting at least a portion of the first message to the second computer system over the one or more networks;
    causing a display of at least the portion of the first message in the second chat window;
    transmitting at least a portion of the second message to the first computer system over the one or more networks;
    causing a display of at least the portion of the second message in the first chat window;
    determining that a corpus of text comprises a reference to at least one of an artist, a title, a genre, an era or lyrics of music, wherein the corpus of text includes at least one of the portion of the first message or the portion of the second message; and in response to determining that the corpus of text comprises the reference, selecting a first song, wherein the first song is associated with at least one of the artist, the title, the genre, the era or the lyrics;

transmitting at least the first song to at least the first computer system over the one or more networks;

causing a first playing of at least the first song by a first audio output device associated with the first computer system during the group communication experience, wherein the first playing is caused by the application executed by the first computer system, and wherein the first chat window remains visible during the first playing; and causing a display of a first media controls window on the first display of the first computer system, wherein the first media controls window is associated with the application executed by the first computer system, and wherein the first media controls window comprises at least one feature for adjusting the first playing of the first song.

2. The system of claim 1, wherein transmitting at least the first song to at least the first computer system over the one or more networks comprises:

transmitting at least the first song to the first computer system over the one or more networks; and transmitting at least the first song to the second computer system over the one or more networks, and wherein the method further comprises:

causing a second playing of at least the first song by a second audio output device associated with the second computer system during the group communication experience, wherein the second playing is caused by the application executed by the second computer system, and wherein the second chat window remains visible during the second playing; and causing a display of a second media controls window on a second display of the second computer system, wherein the second media controls window is associated with the application executed by the second computer system, and wherein the second media controls window comprises at least one feature for adjusting the second playing of the first song.

3. The system of claim 1, wherein the method further comprises:

determining at least a first attribute of the first participant, wherein the first song is selected based at least in part on the first attribute of the first participant;

determining at least a second attribute of the second participant;

selecting a second song based at least in part on the second attribute;

transmitting at least the second song to at least the second computer system over the one or more networks; and causing a second playing of at least the second song by a second audio output device associated with the second computer system during the group communication experience, wherein the second playing is caused by the application executed by the second computer system, and wherein the second chat window remains visible during the second playing; and causing a display of a second media controls window on a second display of the second computer system, wherein the second media controls window is associated with the application executed by the second computer system, and wherein the second media controls window comprises at least one feature for adjusting the second playing of the second song.

4. A method comprising:

receiving at least a first message from a first computer system over one or more networks, wherein the first computer system is associated with a first participant in a group communication experience hosted by a second computer system, wherein the first message is entered by the first participant into a first user interface provided on a first display of the first computer system, and wherein the first user interface is rendered by an application associated with the group communication experience executed by the first computer system;

transmitting, by the second computer system over the one or more networks, the first message to at least some of a plurality of computer systems associated with participants in the group communication experience, wherein the first computer system is one of the plurality of computer systems;

causing a display of at least a portion of the first message on displays of the at least some of the plurality of computer systems, wherein at least the portion of the first message is caused to be displayed in user interfaces provided on displays of each of the at least some of the plurality of computer systems, and wherein each of the user interfaces is rendered by the application executed by each of the at least some of the plurality of computer systems;

identifying, by the second computer system, at least a first song based at least in part on a first set of text of the first message;

causing, by the second computer system, at least some of the first song to be transmitted to at least one of the plurality of computer systems over the one or more networks; and causing, by the second computer system, the at least some of the first song to be played by audio output devices associated with the at least one of the plurality of computer systems during the group communication experience, wherein the at least some of the first song is caused to be played by the application executed by each of the at least some of the plurality of computer systems.

5. The method of claim 4, wherein identifying at least the first song comprises:

determining, by the second computer system, that the first set of text comprises at least one reference to at least one of an artist, a title, a genre, an era or lyrics of music; and selecting the first song based at least in part on the at least one of the artist, the title, the genre, the era or the lyrics.

6. The method of claim 4, wherein identifying at least the first song comprises:

providing, by the second computer system, at least a portion of the first set of text as an input to at least one machine learning algorithm operated by the second computer system, wherein the at least one machine learning algorithm is trained to identify a sentiment within text;

receiving an output from the at least one machine learning algorithm in response to the input; and determining a sentiment of one of the group communication experience or the first message based at least in part on the output, wherein at least the first song is identified based at least in part on the sentiment.

7. The method of claim 4, further comprising:

receiving at least a second message from a third computer system over the one or more networks, wherein the third computer system is associated with a second participant in the group communication experience hosted by the second computer system, wherein the third message is entered by the second participant into a second user interface provided on a second display of the third computer system, and wherein the second user interface is rendered by the application executed by the third computer system; and transmitting, by the second computer system over the one or more networks, the second message to the at least some of the plurality of computer systems, wherein the third computer system is one of the plurality of computer systems, wherein at least the first song is identified based at least in part on the first set of text and a second set of text of the second message.

8. The method of claim 4, further comprising:

establishing, by the second computer system, two-way communication connections between the second computer system and each of the plurality of computer systems, and wherein the at least some of the first song is caused to be transmitted to the at least one of the plurality of computer systems by the second computer system via at least one of the two-way communication connections.

9. The method of claim 4, further comprising:

determining, by the second computer system, that at least the first song is stored in association with a third computer system;

establishing, by the second computer system, a one-way communication connection between the third computer system and the second computer system; and receiving, by the second computer system, at least the first song by way of the one-way communication connection, wherein at least the first song is caused to be transmitted to the at least one of the plurality of computer systems by at least some of the two-way communication connections.

10. The method of claim 4, further comprising:

identifying, by the second computer system, a plurality of songs based at least in part on the first set of text, wherein the plurality of songs includes at least the first song; and determining, by the second computer system, a ranking of the plurality of songs based at least in part on at least one of:

an artist, a genre, a mood, a tempo or a style of the songs;

a level of popularity of the songs;

a context of the group communication experience; or a time at which a message including at least one reference to at least one of the songs was received.

11. The method of claim 10, further comprising:

receiving, by the second computer system, at least a second message from a third computer system, wherein the second message is entered by a second participant in the group communication experience into a second user interface provided on a second display of the third computer system, wherein the second user interface is rendered by the application executed by the third computer system, and wherein the third computer system is one of the plurality of computer systems;

determining, by the second computer system, that the second message comprises negative feedback; and in response to determining that the second message comprises negative feedback, selecting, by the second computer system, a second based at least in part on the ranking; and causing, by the second computer system, at least some of the second song to be transmitted to at least one of the plurality of computer systems over the one or more networks.

12. The method of claim 4, wherein identifying at least the first song comprises:

determining, by the second computer system, at least one attribute of each of a plurality of participants in the group communication experience; and selecting, by the second computer system, at least the first song based at least in part on a similarity of the first song to the at least one attribute of at least one of the plurality of participants.

13. The method of claim 4, wherein each of the user interfaces comprises at least a first window sized or shaped to appear on a portion of one of the displays, and wherein each of the user interfaces remains visible as the at least some of the first song is caused to be played by the application executed by each of the at least some of the plurality of computer systems.

14. The method of claim 13, further comprising:

causing, by the second computer system, a display of at least a second window in each of the user interfaces, wherein the second window is provided in association with the first window, and wherein the second window comprises:

a first interactive feature for playing or pausing at least the first song; and a second interactive feature for selecting or changing a volume level of at least the first song.

15. The method of claim 4, wherein causing the at least some of the first song to be transmitted to at least one of the plurality of computer systems over the one or more networks comprises:

transmitting, by the second computer system, the first song to each of the plurality of computer systems over the one or more networks.

16. The method of claim 4, wherein causing the least some of the first song to be transmitted to at least one of the plurality of computer systems over the one or more networks comprises:

transmitting, by the second computer system, the first song to the first computer system over the one or more networks; and causing, by the second computer system, the first computer system to play at least the first song during the group communication experience, and wherein the method further comprises:

identifying, by the second computer system, at least a second song based at least in part on the first set of text;

transmitting, by the second computer system, the second song to a third computer system over the one or more networks, wherein the third computer system is one of the plurality of computer systems; and causing, by the second computer system, the third computer system to play at least the second song during the group communication experience.

17. The method of claim 4, wherein the first computer system is at least a portion of one of:
    an automobile;
    a desktop computer;
    a laptop computer;
    a media player;
    a smartphone;
    a smart speaker;
    a tablet computer; or
    a wristwatch.

18. A method comprising:
    receiving, by a first computer system, a plurality of messages from computer systems over one or more networks, wherein each of the computer systems is associated with at least one of a plurality of participants in a group communication experience hosted by the first computer system, and wherein each of the plurality of messages is entered by one of the participants into a user interface of an application associated with the group communication experience rendered on a display of one of the computer systems;
    determining, by the first computer system, that at least one reference to one of a genre of music, an era of music, a lyric of music or a classification of music is included in a corpus of text, wherein the corpus of text comprises at least some of the plurality of messages;
    in response to determining that the at least one reference is included in the corpus of text,
        identifying, by the first computer system, a plurality of songs associated with one of the genre, the era, the lyric or the classification;
    determining, by the first computer system, at least one attribute of each of the plurality of participants;
    selecting, by the first computer system, one of the plurality of songs for each of the participants, wherein each of the selected songs is selected based at least in part on the at least one attribute of one of the plurality of participants;
    transmitting, by the first computer system, the selected songs to computer systems of the participants for which the songs were selected over the one or more networks; and
    causing, by the first computer system, the selected songs to be played by the application associated with the group communication experience on at least one audio output device of each of the computer systems of the participants for which the selected songs were selected during the group communication experience, wherein the user interface of the application remains visible as the selected songs are caused to be played.

19. The method of claim 18, wherein the user interface comprises:
    a first window comprising:
        at least a portion of the plurality of messages;
        a text box configured to receive text entered by one of the participants; and
        an interactive feature for causing the text entered by the one of the participants to be transmitted to the first computer system; and
    a second window comprising:
        a first interactive feature for playing or pausing at least the selected songs; and
        a second interactive feature for selecting or changing a volume level of at least the selected songs.

20. The method of claim 18, wherein each of the computer systems is a portion of one of:
    an automobile;
    a desktop computer;
    a laptop computer;
    a media player;
    a smartphone;
    a smart speaker;
    a tablet computer; or
    a wristwatch.

* * * * *